(12) United States Patent
Leung

(10) Patent No.: US 12,328,619 B2
(45) Date of Patent: Jun. 10, 2025

(54) CONSIDERATIONS ON QUALITY OF SERVICE (QOS) HINTS FOR AN UPLINK STREAMING SERVICE

(71) Applicant: QUALCOMM Incorporated, San Diego, CA (US)

(72) Inventor: Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 17/060,816

(22) Filed: Oct. 1, 2020

(65) Prior Publication Data

US 2021/0112439 A1    Apr. 15, 2021

Related U.S. Application Data

(60) Provisional application No. 62/915,554, filed on Oct. 15, 2019.

(51) Int. Cl.
*H04L 65/65* (2022.01)
*H04L 65/1016* (2022.01)
(Continued)

(52) U.S. Cl.
CPC ..... *H04W 28/0268* (2013.01); *H04L 65/1016* (2013.01); *H04L 65/1069* (2013.01); *H04L 65/65* (2022.05); *H04W 28/0236* (2013.01)

(58) Field of Classification Search
CPC .......... H04W 28/0268; H04W 28/0236; H04L 65/1016; H04L 65/1069; H04L 65/608;
(Continued)

(56) References Cited

U.S. PATENT DOCUMENTS 6,735,175 B1 * 5/2004 Havens ............... H04L 65/1083
370/465
7,263,095 B1    8/2007 Sarkar
(Continued)

FOREIGN PATENT DOCUMENTS

CN          101208982 A       6/2008
WO          2019150286 A1     8/2019

OTHER PUBLICATIONS

Ericsson LM et al., "Amended QoS Signaling", S4-AHM495, 3GPP TSG-SA4 Meeting #106, Telco #10, E_FLUS, Oct. 1, 2019—16-18 CEST, Draft Change Request, 6 Pages.
(Continued)

*Primary Examiner* — Syed Ali
(74) *Attorney, Agent, or Firm* — Guang Y. Zhang; MG-IP Law, P.C.

(57) ABSTRACT

In an aspect, an answerer receives, from an offeror, a first plurality of quality of service (QoS) parameters for a multimedia session, the first plurality of QoS parameters including first loss and/or latency parameters indicating first desirable maximum end-to-end packet loss and/or latency for the multimedia session, determines that the first desirable maximum end-to-end packet loss is higher than a second desirable maximum end-to-end packet loss, the first desirable maximum end-to-end packet latency is higher than a second desirable maximum end-to-end packet latency, or both, and sends, to the offeror, a second plurality of QoS parameters for the multimedia session, the second plurality of QoS parameters including a second loss parameter indicating the second desirable maximum end-to-end packet loss, a second latency parameter indicating the second desirable maximum end-to-end packet latency, or both.

58 Claims, 10 Drawing Sheets

(51) Int. Cl.
  *H04L 65/1069* (2022.01)
  *H04W 28/02* (2009.01)
(58) Field of Classification Search
  CPC . H04L 47/748; H04L 43/0852; H04L 47/801;
    H04L 65/65; H04L 69/24; H04L 47/283;
    H04L 47/824; H04L 43/0829; H04L
    65/80; H04L 47/2416; H04L 47/805
  See application file for complete search history.

(56) References Cited

U.S. PATENT DOCUMENTS

| | | | | |
|---|---|---|---|---|
| 9,130,857 | B2* | 9/2015 | Han | H04L 47/15 |
| 9,509,743 | B1* | 11/2016 | Mulcahy | H04L 43/08 |
| 9,544,808 | B2* | 1/2017 | Kalapatapu | H04W 28/0236 |
| 10,554,481 | B2* | 2/2020 | Bouvet | H04L 65/103 |
| 10,581,928 | B2* | 3/2020 | Aravamudhan | H04L 65/1069 |
| 2004/0071084 | A1* | 4/2004 | El-Hennawey | H04M 3/2236 |
| | | | | 370/235 |
| 2005/0157660 | A1* | 7/2005 | Mandato | H04L 47/724 |
| | | | | 370/254 |
| 2005/0281204 | A1* | 12/2005 | Karol | H04L 43/50 |
| | | | | 370/252 |
| 2006/0251093 | A1* | 11/2006 | Curcio | H04L 47/14 |
| | | | | 370/252 |
| 2006/0285497 | A1* | 12/2006 | Miller | H04L 67/14 |
| | | | | 370/395.21 |
| 2007/0211631 | A1* | 9/2007 | Rahman | H04L 47/805 |
| | | | | 370/230 |
| 2009/0213749 | A1* | 8/2009 | Han | H04W 76/12 |
| | | | | 370/252 |
| 2013/0070595 | A1* | 3/2013 | Yen | H04L 69/24 |
| | | | | 370/235 |
| 2015/0003242 | A1* | 1/2015 | Han | H04L 47/2433 |
| | | | | 370/230 |
| 2016/0105821 | A1* | 4/2016 | Senarath | H04W 72/087 |
| | | | | 370/329 |
| 2018/0213444 | A1* | 7/2018 | Khawand | H04W 28/0268 |
| 2018/0352092 | A1 | 12/2018 | Rajendran et al. | |
| 2019/0182741 | A1 | 6/2019 | Oyman | |
| 2019/0335534 | A1* | 10/2019 | Atarius | H04L 65/1016 |
| 2019/0379735 | A1* | 12/2019 | Huang | H04L 67/1091 |
| 2020/0068446 | A1* | 2/2020 | Nimbavikar | H04L 47/20 |
| 2020/0145876 | A1* | 5/2020 | Dao | H04L 12/1407 |
| 2020/0186574 | A1* | 6/2020 | Amin | H04W 8/18 |
| 2020/0229040 | A1* | 7/2020 | Sun | H04W 28/10 |
| 2020/0229118 | A1* | 7/2020 | Martinez-Minguito | |
| | | | | H04L 63/0442 |
| 2020/0260336 | A1* | 8/2020 | Wu | H04W 36/0033 |
| 2020/0359395 | A1* | 11/2020 | Lohmar | H04L 65/4069 |
| 2020/0367110 | A1* | 11/2020 | Sun | H04L 43/16 |
| 2020/0374721 | A1* | 11/2020 | Kumar | H04W 24/06 |
| 2021/0037586 | A1* | 2/2021 | Foti | H04L 69/40 |
| 2021/0084524 | A1* | 3/2021 | Foti | H04W 28/24 |
| 2021/0409475 | A1* | 12/2021 | Oyman | H04L 65/1083 |
| 2022/0159044 | A1* | 5/2022 | Oyman | H04L 65/65 |
| 2022/0255867 | A1* | 8/2022 | Arrobo Vidal | H04W 28/0268 |

OTHER PUBLICATIONS

Ericsson LM: "Media Indication and QoS Considerations for MTSI-Based FLUS", S4-AHM493, 3GPP TSG-SA4 MTSI SWG Telco on E-FLUS, Sep. 9, 2019, pp. 1-4.
International Search Report and Written Opinion—PCT/US2020/053930—ISA/EPO—Jan. 12, 2021.
Qualcomm Incorporated: "Considerations on QoS Hints for MTSI and FLUS", S4-191113, 3GPP TSG-SA4 Meeting #106, Busan, Korea (Republic Of), Oct. 21, 2019-Oct. 25, 2019, 4 Pages.
Taiwan Search Report—TW109134417—TIPO—Dec. 20, 2023.

* cited by examiner

CONSIDERATIONS ON QUALITY OF SERVICE (QOS) HINTS FOR AN UPLINK STREAMING SERVICE

CROSS-REFERENCE TO RELATED APPLICATIONS

The present application for patent claims the benefit of U.S. Provisional Application No. 62/915,554, entitled "CONSIDERATIONS ON QUALITY OF SERVICE (QOS) HINTS FOR AN UPLINK STREAMING SERVICE," filed Oct. 15, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including Cellular and Personal Communications Service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by an answerer includes receiving, from an offeror, a first plurality of quality of service (QoS) parameters for a multimedia session to be established between the offeror and the answerer, the first plurality of QoS parameters including a first loss parameter indicating a first desirable maximum end-to-end packet loss for the multimedia session, a first latency parameter indicating a first desirable maximum end-to-end packet latency for the multimedia session, or both; determining that the first desirable maximum end-to-end packet loss is higher than a second desirable maximum end-to-end packet loss for the multimedia session, the first desirable maximum end-to-end packet latency is higher than a second desirable maximum end-to-end packet latency for the multimedia session, or both; and sending, to the offeror, a second plurality of QoS parameters for the multimedia session, the second plurality of QoS parameters including a second loss parameter indicating the second desirable maximum end-to-end packet loss, a second latency parameter indicating the second desirable maximum end-to-end packet latency, or both.

In an aspect, a method of wireless communication performed by an offeror includes sending, to an answerer, a first plurality of QoS parameters for a multimedia session to be established between the offeror and the answerer, the first plurality of QoS parameters including a first loss parameter indicating a first desirable maximum end-to-end packet loss for the multimedia session, a first latency parameter indicating a first desirable maximum end-to-end packet latency for the multimedia session, or both; receiving, from the answerer, a second plurality of QoS parameters for the multimedia session, the second plurality of QoS parameters including a second loss parameter indicating a second desirable maximum end-to-end packet loss for the multimedia session, a second latency parameter indicating a second desirable maximum end-to-end packet latency for the multimedia session, or both; determining whether or not the offeror can establish the multimedia session with the answerer based on the multimedia session having the second plurality of QoS parameters; and establishing the multimedia session with the answerer, the multimedia session having the second plurality of QoS parameters.

In an aspect, an answerer apparatus includes a memory; a communication device; and at least one processor communicatively coupled to the memory and the communication device, the at least one processor configured to: receive, from an offeror apparatus, a first plurality of QoS parameters for a multimedia session to be established between the offeror and the answerer apparatus, the first plurality of QoS parameters including a first loss parameter indicating a first desirable maximum end-to-end packet loss for the multimedia session, a first latency parameter indicating a first desirable maximum end-to-end packet latency for the multimedia session, or both; determine that the first desirable maximum end-to-end packet loss is higher than a second desirable maximum end-to-end packet loss for the multimedia session, the first desirable maximum end-to-end packet latency is higher than a second desirable maximum end-to-end packet latency for the multimedia session, or both; and cause the communication device to send, to the offeror apparatus, a second plurality of QoS parameters for the multimedia session, the second plurality of QoS parameters including a second loss parameter indicating the second desirable maximum end-to-end packet loss, a second latency parameter indicating the second desirable maximum end-to-end packet latency, or both.

In an aspect, an offeror apparatus includes a memory; a communication device; and at least one processor communicatively coupled to the memory and the communication device, the at least one processor configured to: cause the communication device to send, to an answerer apparatus, a first plurality of QoS parameters for a multimedia session to be established between the offeror apparatus and the answerer apparatus, the first plurality of QoS parameters including a first loss parameter indicating a first desirable maximum end-to-end packet loss for the multimedia session, a first latency parameter indicating a first desirable maximum end-to-end packet latency for the multimedia session, or both; receive, from the answerer apparatus, a second plurality of QoS parameters for the multimedia session, the second plurality of QoS parameters including a second loss parameter indicating a second desirable maximum end-to-end packet loss for the multimedia session, a second latency parameter indicating a second desirable maximum end-to-end packet latency for the multimedia session, or both; determine whether or not the offeror apparatus can establish the multimedia session with the answerer apparatus based on the multimedia session having the second plurality of QoS parameters; and establish the multimedia session with the answerer apparatus, the multimedia session having the second plurality of QoS parameters.

In an aspect, an answerer apparatus includes means for receiving, from an offeror apparatus, a first plurality of QoS parameters for a multimedia session to be established between the offeror apparatus and the answerer apparatus, the first plurality of QoS parameters including a first loss parameter indicating a first desirable maximum end-to-end packet loss for the multimedia session, a first latency parameter indicating a first desirable maximum end-to-end packet latency for the multimedia session, or both; means for determining that the first desirable maximum end-to-end packet loss is higher than a second desirable maximum end-to-end packet loss for the multimedia session, the first desirable maximum end-to-end packet latency is higher than a second desirable maximum end-to-end packet latency for the multimedia session, or both; and means for sending, to the offeror apparatus, a second plurality of QoS parameters for the multimedia session, the second plurality of QoS parameters including a second loss parameter indicating the second desirable maximum end-to-end packet loss, a second latency parameter indicating the second desirable maximum end-to-end packet latency, or both.

In an aspect, an offeror apparatus includes means for sending, to an answerer apparatus, a first plurality of QoS parameters for a multimedia session to be established between the offeror apparatus and the answerer apparatus, the first plurality of QoS parameters including a first loss parameter indicating a first desirable maximum end-to-end packet loss for the multimedia session, a first latency parameter indicating a first desirable maximum end-to-end packet latency for the multimedia session, or both; means for receiving, from the answerer apparatus, a second plurality of QoS parameters for the multimedia session, the second plurality of QoS parameters including a second loss parameter indicating a second desirable maximum end-to-end packet loss for the multimedia session, a second latency parameter indicating a second desirable maximum end-to-end packet latency for the multimedia session, or both; means for determining whether or not the offeror apparatus can establish the multimedia session with the answerer apparatus based on the multimedia session having the second plurality of QoS parameters; and means for establishing the multimedia session with the answerer apparatus, the multimedia session having the second plurality of QoS parameters.

In an aspect, a non-transitory computer-readable medium storing computer-executable instructions includes computer-executable instructions comprising: at least one instruction instructing an answerer to receive, from an offeror, a first plurality of QoS parameters for a multimedia session to be established between the offeror and the answerer, the first plurality of QoS parameters including a first loss parameter indicating a first desirable maximum end-to-end packet loss for the multimedia session, a first latency parameter indicating a first desirable maximum end-to-end packet latency for the multimedia session, or both; at least one instruction instructing the answerer to determine that the first desirable maximum end-to-end packet loss is higher than a second desirable maximum end-to-end packet loss for the multimedia session, the first desirable maximum end-to-end packet latency is higher than a second desirable maximum end-to-end packet latency for the multimedia session, or both; and at least one instruction instructing the answerer to send, to the offeror, a second plurality of QoS parameters for the multimedia session, the second plurality of QoS parameters including a second loss parameter indicating the second desirable maximum end-to-end packet loss, a second latency parameter indicating the second desirable maximum end-to-end packet latency, or both.

In an aspect, a non-transitory computer-readable medium storing computer-executable instructions includes computer-executable instructions comprising: at least one instruction instructing an offeror to send, to an answerer, a first plurality of QoS parameters for a multimedia session to be established between the offeror and the answerer, the first plurality of QoS parameters including a first loss parameter indicating a first desirable maximum end-to-end packet loss for the multimedia session, a first latency parameter indicating a first desirable maximum end-to-end packet latency for the multimedia session, or both; at least one instruction instructing the offeror to receive, from the answerer, a second plurality of QoS parameters for the multimedia session, the second plurality of QoS parameters including a second loss parameter indicating a second desirable maximum end-to-end packet loss for the multimedia session, a second latency parameter indicating a second desirable maximum end-to-end packet latency for the multimedia session, or both; at least one instruction instructing the offeror to determine whether or not the offeror can establish the multimedia session with the answerer based on the multimedia session having the second plurality of QoS parameters; and at least one instruction instructing the offeror to establish the multimedia session with the answerer, the multimedia session having the second plurality of QoS parameters.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
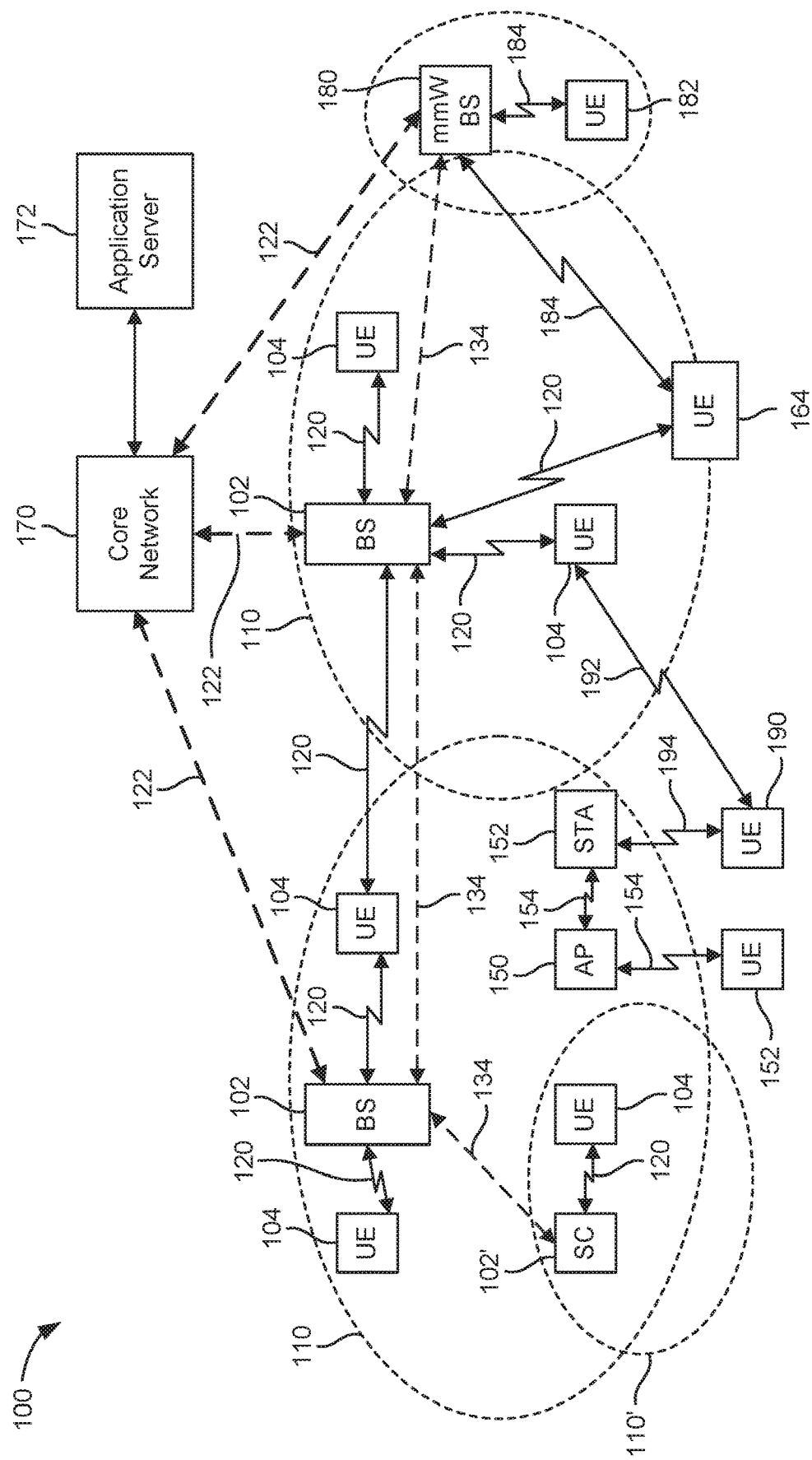
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more application servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
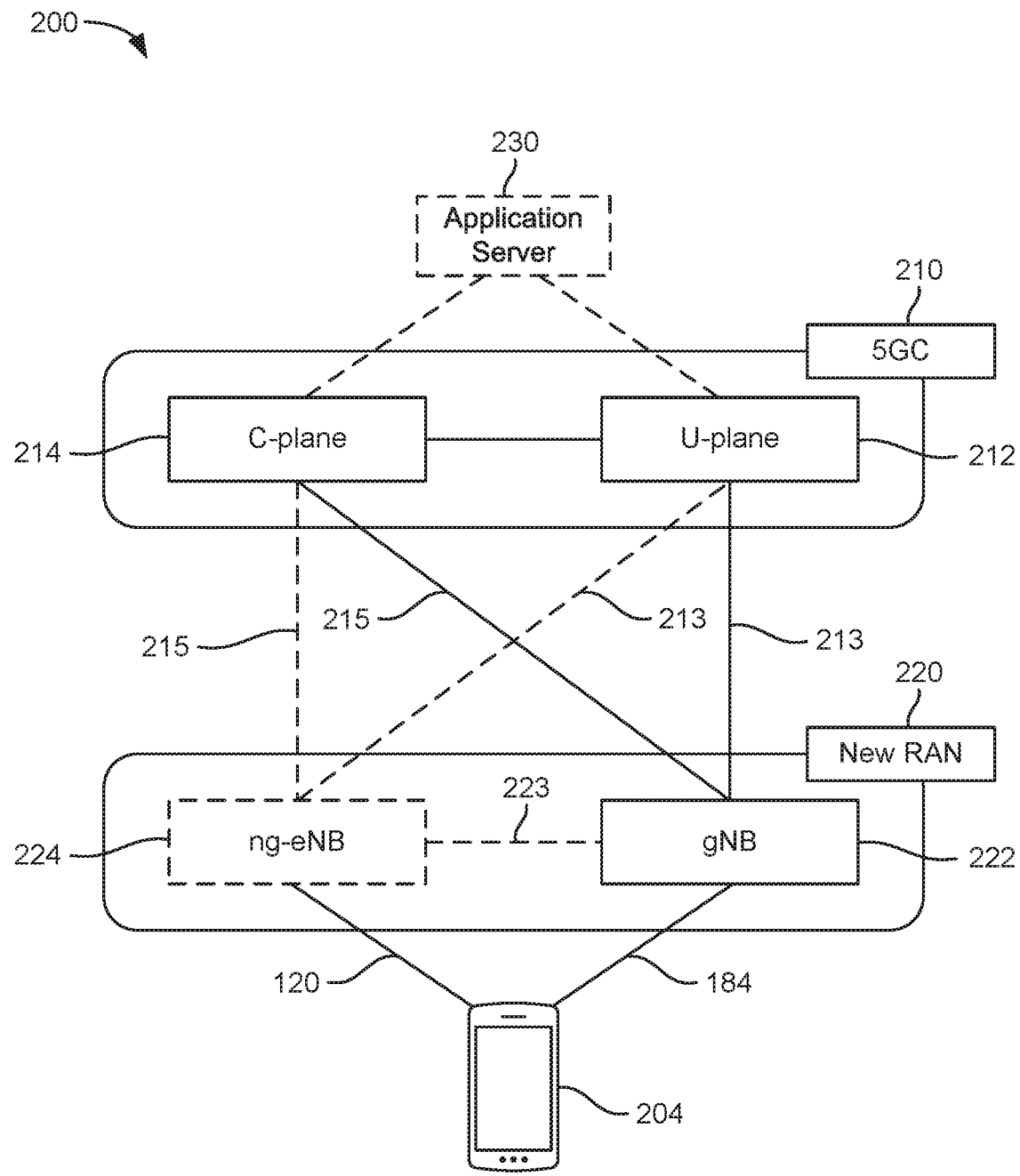
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
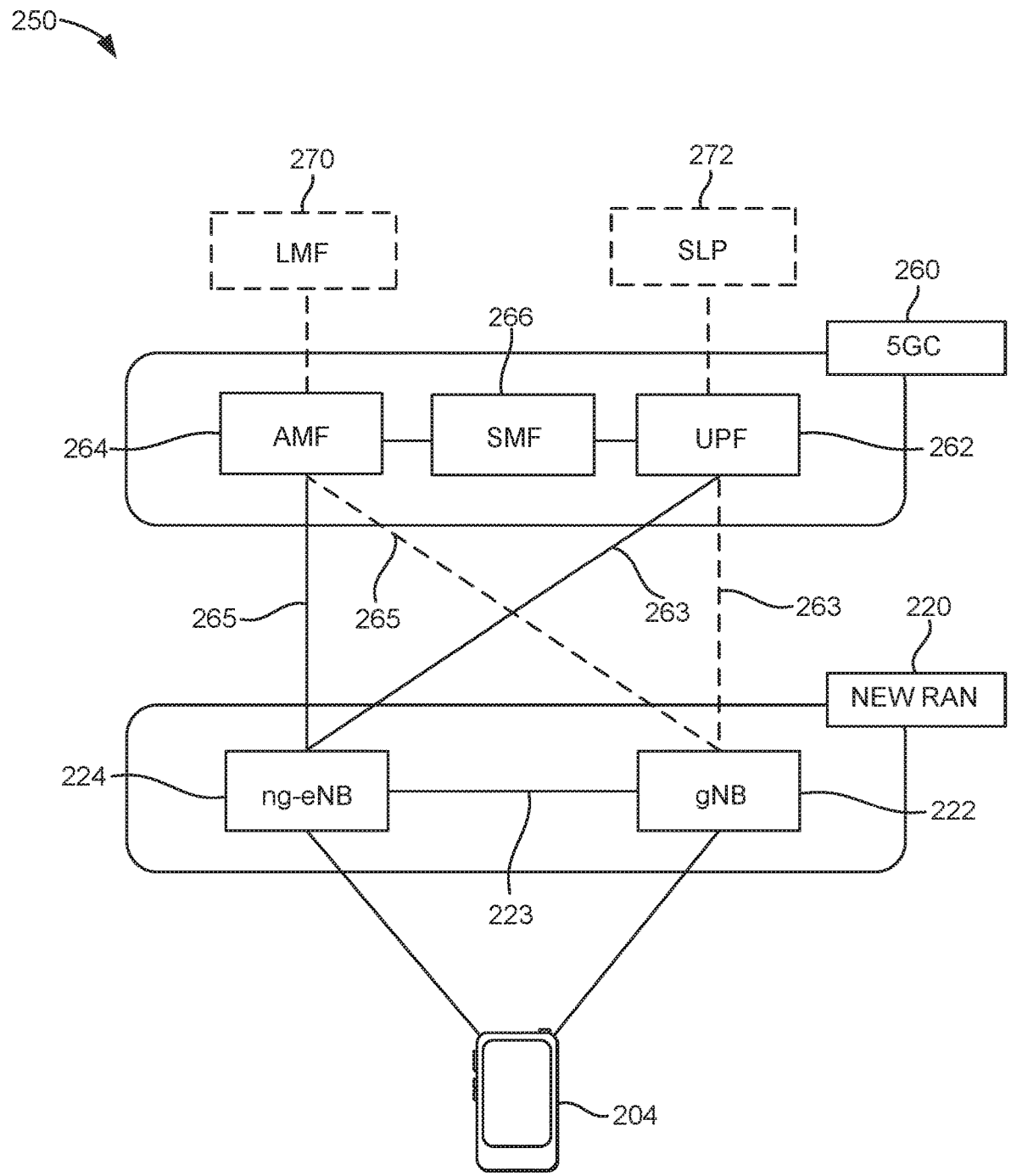

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
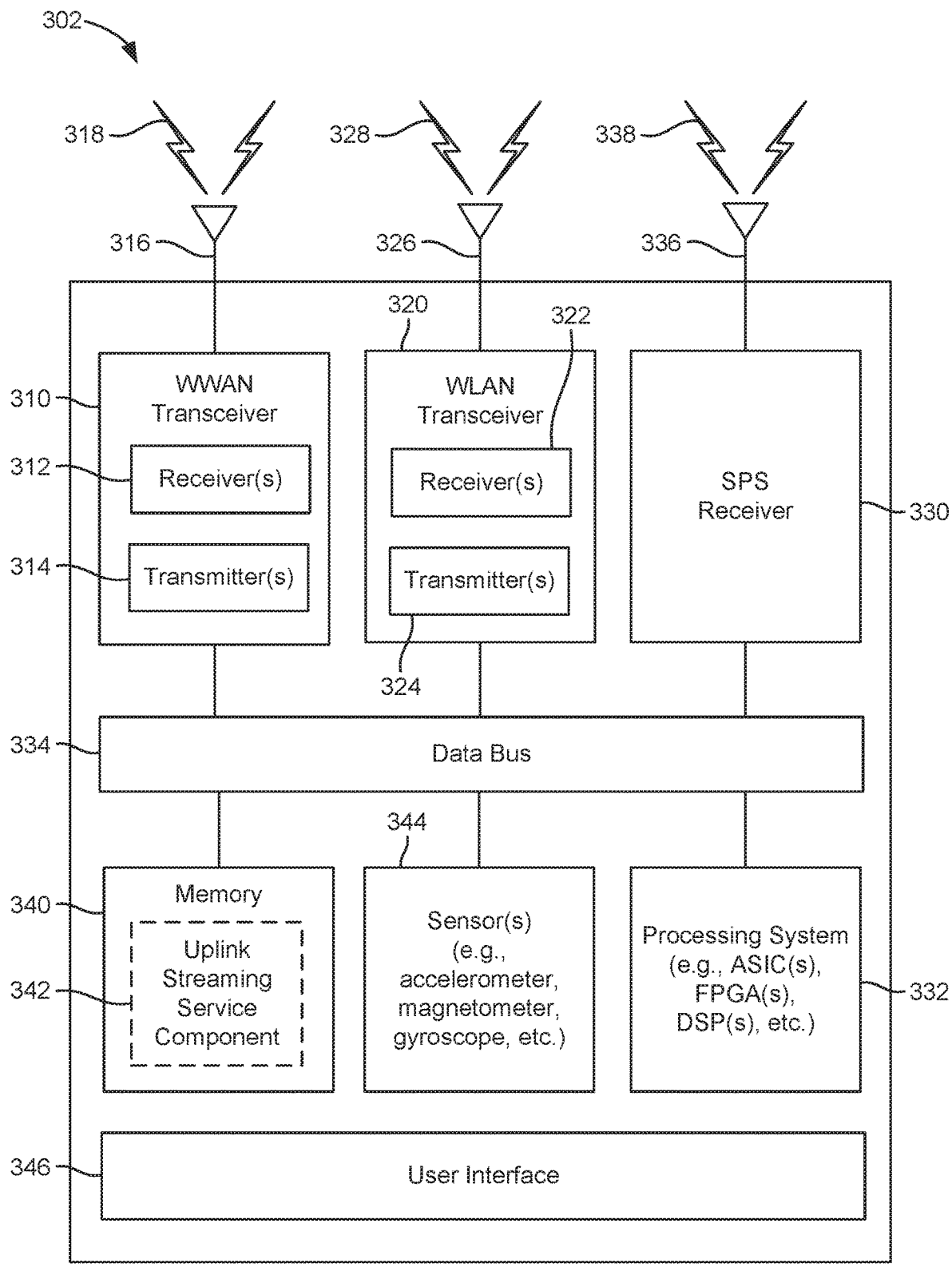
FIGS. 3A to 3C are simplified block diagrams of several sample aspects of components that may be employed in a user equipment (UE), a base station, and a network entity, respectively.
Figure 3B:
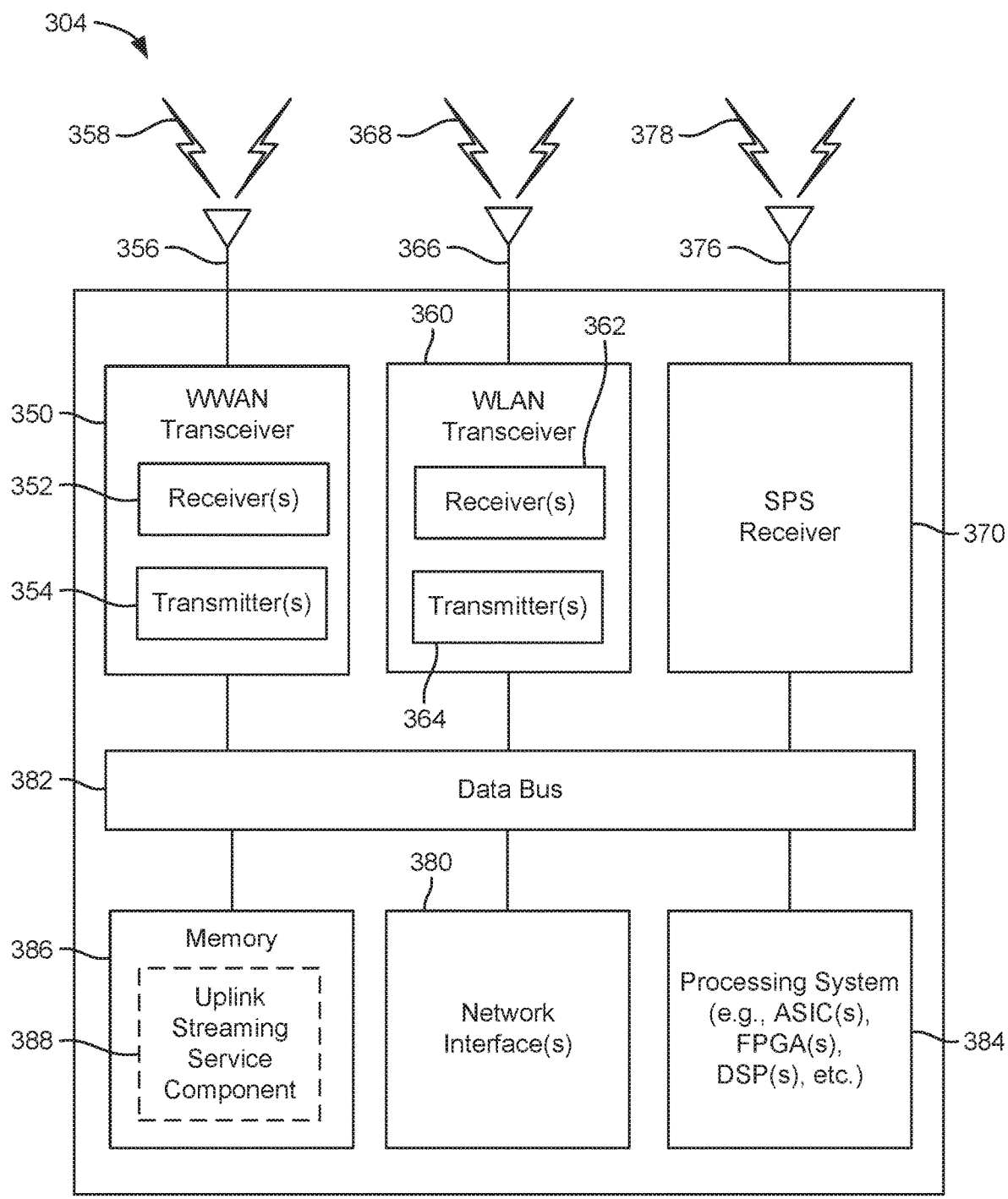
Figure 3C:
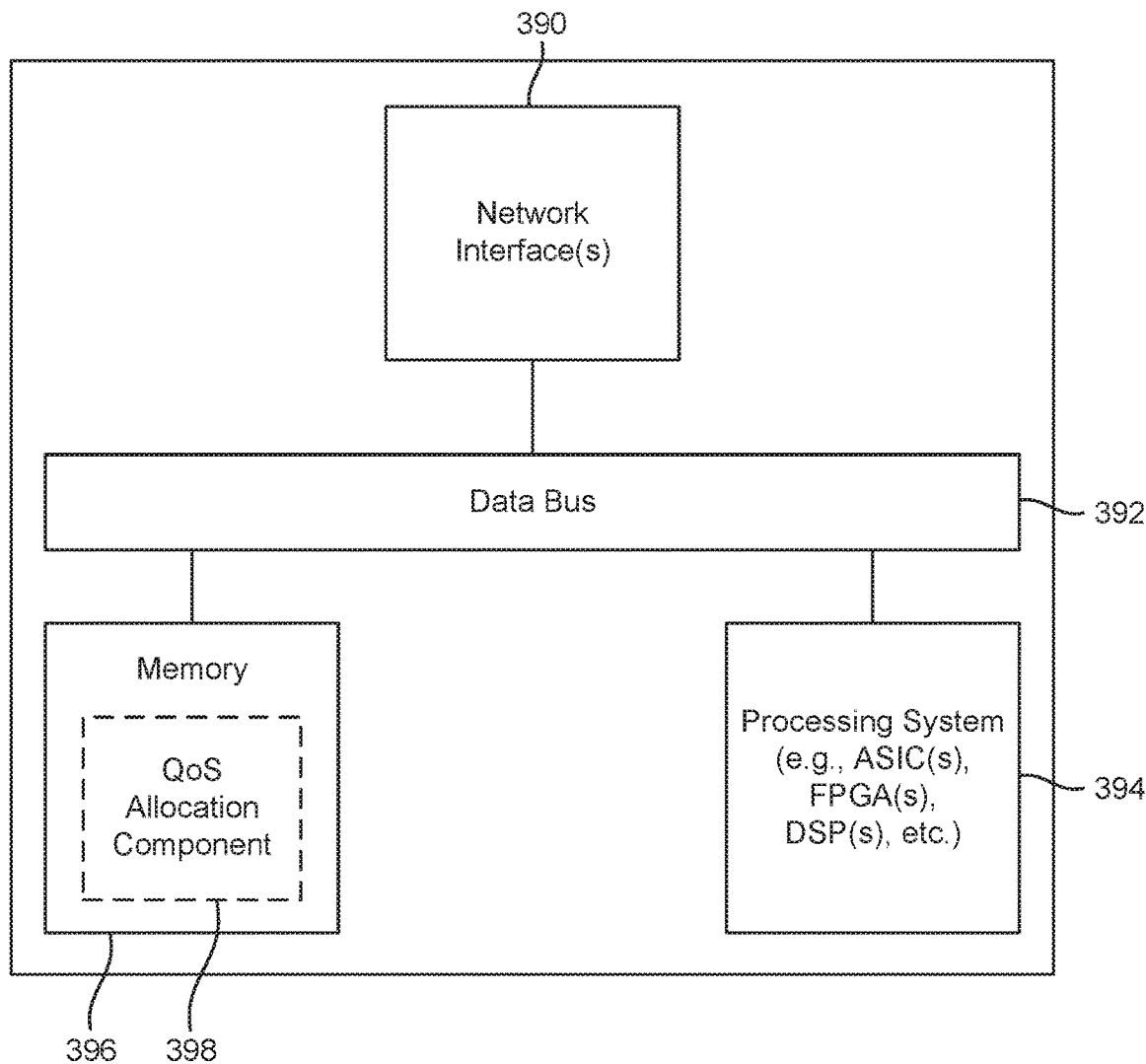

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the application server 172, the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302 and the base station 304 may include uplink streaming service components 342 and 388, respectively, and the network entity 306 may include a QoS allocation component 398. The components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the components 342, 388, and 398 may be external to the processing systems 332, 384, and 394 (e.g., part of a modem processing system, integrated with another processing system, etc.). Alternatively, the components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the components 342, 388, and 398, etc.

When UEs supporting multimedia (e.g., speech) services reach the edge of network coverage (e.g., the edge of a WWAN, such as an LTE or NR network), the network typically examines a handover threshold and decides whether to handoff the UE to a different radio access technology (RAT) based on measurement reports from the UE. For example, although LTE and NR networks were initially deployed to support data services, LTE and NR networks have evolved to increasingly support real-time multimedia-based services, such as framework for live uplink streaming (FLUS), multimedia telephony service for internet protocol (IP) multimedia subsystem (IMS) (MTSI), virtual reality, augmented reality, telepresence, split rendering (where the network shares the graphics processing load with the UE), etc.

Uplink coverage in certain networks (e.g., LTE and NR networks) tends to be limited, or at least more limited than downlink coverage. As such, an issue that arises is that the uplink coverage from the UE to the base station (e.g., eNB, gNB) at the network edge tends to be weak (e.g., resulting in a higher packet loss rate (PLR) or block error rate (BLER)). Accordingly, a threshold is defined to hand over multimedia-based sessions to avoid further degradation in the service due to increased packet loss. In these scenarios, the UE examines the handover threshold and decides when to handoff from one radio cell to an adjacent radio cell with similar radio access technologies, for example, or to a different RAT altogether, such as a WLAN.

In general, the handover threshold can vary, even from one UE to another, as the effect of packet loss on the multimedia service may depend on various factors, such as the multimedia codec or codec mode that the service is using, the packet loss concealment (PLC) algorithms implemented at the receiving UE(s), and the jitter (or de jitter) buffer management (JBM) implementation in use at the receiving UE(s). For example, one multimedia codec that can be used is the Adaptive Multi-Rate (AMR) audio codec, which uses link adaptation to select from one of eight different bit rates based on link conditions and is generally used in circuit-switched networks. Another multimedia codec is the Adaptive Multi-Rate Wideband (AMR-WB), which is similar to the AMR codec except that AMR-WB provides improved speech quality due to a wider speech bandwidth compared to the AMR audio codec. Yet another multimedia codec, Enhanced Voice Services (EVS), offers greater robustness than AMR and AMR-WB and also offers a Channel-Aware mode that includes partial redundancy based packet loss concealment mechanisms resulting in improved quality/intelligibility relative to EVS non-channel-aware modes or AMR/AMR-WB.

Furthermore, PLC algorithms, such as zero insertion, waveform substitutions, model-based methods, and so on, can mask the effects of packet loss, to an extent. This is because multimedia signals are sent over a network in packets that may travel different routes to a destination and consequently arrive late, corrupted, out-of-order, or not at all. Relatedly, because packets may arrive at a decoder out-of-order or with random jitters in arrival time, JBM implementations may use different techniques to absorb the jitter(s) in the packet arrival times so that a multimedia packet may be fed to the decoder at evenly spaced periodic intervals. Consequently, there are various factors that may influence the packet loss that each UE can tolerate to maintain a quality multimedia session.

Figure 4:
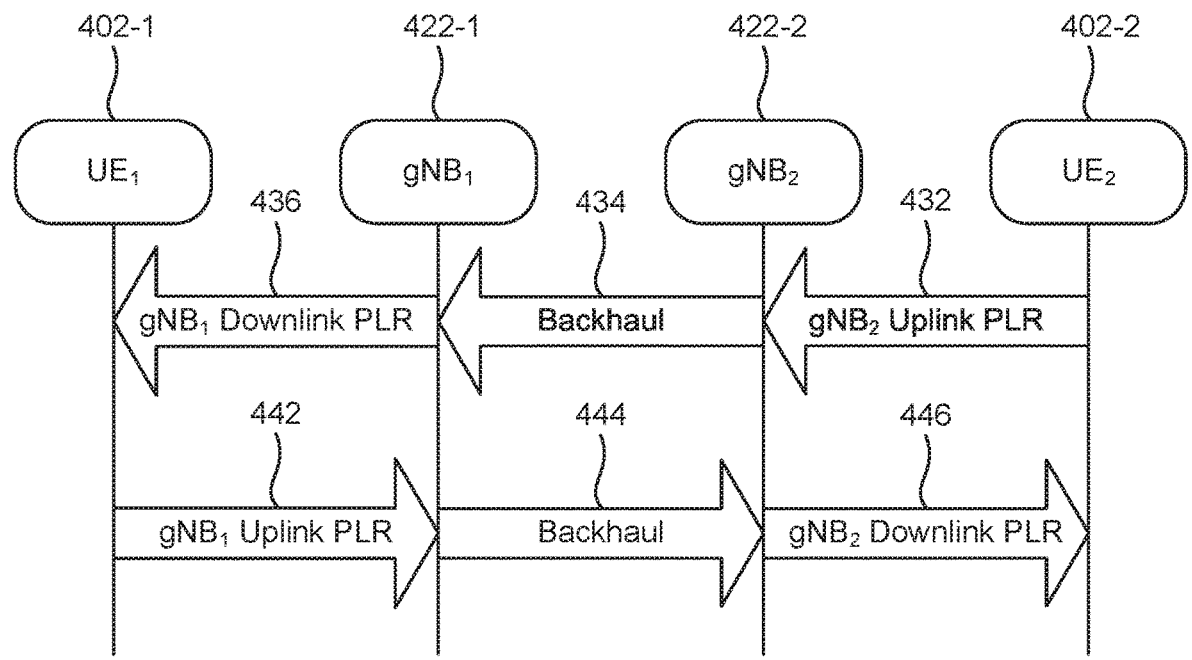
FIG. 4 illustrates an example end-to-end communication flow between two terminals engaged in a multimedia-based communication session, according to various aspects of the disclosure.

One of the challenges in setting the appropriate handover threshold, which is generally handled at a mobile infrastructure in a WWAN or other wireless network, (e.g., at the gNB in an NR network), is to ensure that the end-to-end (e2e) error rate across the transport path from the media sender to the media receiver does not exceed the maximum packet loss that the codec, PLC, and JBM can handle without resulting in substantially degraded quality and/or intelligibility. For example, FIG. 4 illustrates an example end-to-end communication flow between two UEs engaged in a multimedia-based communication session, according to various aspects of the disclosure. In the example of FIG. 4, multimedia transmissions in a direction from a UE 402-2 to a UE 402-1 (which may correspond to any of the UEs described herein) are sent on an uplink 432 from UE 402-2 to its serving gNB 422-2 (e.g., any of the base stations described herein). The gNB 422-2 forwards the transmissions to the serving gNB 422-1 (e.g., any other of the base stations described herein) for the UE 402-1 over a backhaul link 434. The serving gNB 422-1 then sends the multimedia transmissions to the receiving UE 402-1 on a downlink 436. Similarly, in the opposite direction, multimedia transmissions from UE 402-1 to UE 402-2 are sent on an uplink 442 from UE 402-1 to the serving gNB 422-1, which then forwards the transmissions to the serving gNB 422-2 for the UE 402-2 over a backhaul link 444. The serving gNB 422-2 then sends the multimedia transmissions to the receiving UE 402-2 on a downlink 446.

Assuming that there is no packet loss, or negligible packet loss, on the backhaul links 434, 444, then for the multimedia transmissions sent in the direction from UE 402-2 to UE 402-1, the sum of the PLR on the uplink 432 and the downlink 436 should be less than or equal to the maximum PLR for the codec, the PLC algorithm(s), and the JBM implementation(s) in use at UE 402-1. Similarly, in the direction of transmitting multimedia from UE 402-1 to UE 402-2, the sum of the PLR on the uplink 442 and the downlink 446 should be less than or equal to the maximum PLR for the codec, the PLC algorithm(s), and the JBM implementation(s) in use at UE 402-2.

FLUS enables live media streaming from a source entity (also referred to as a "FLUS source" or simply a "source") to a sink entity (also referred to as a "FLUS sink" or simply a "sink"). For example, referring to FIG. 4, for transmissions from UE 402-1 to UE 402-2, UE 402-1 would be the FLUS source entity and UE 402-2 would be the FLUS sink entity. FLUS offers an IMS-based and a non-IMS-based instantiation. The IMS/MTSI-based instantiation enables the establishment of live media streaming between two UEs or between a source entity and a sink entity, within and across operator networks. Compared with MTSI, where limited types of QoS for speech or video media are available, FLUS can provide a wider range of QoS operation in, for example, the maximum delay, available bandwidth, or target PLR. In the non-IMS-based instantiation, it is possible to operate FLUS as a more generic framework that is controlled through a RESTful application programing interface (API) and that supports other media plane protocols (i.e. not based on IMS or MTSI). In addition to providing a wider range of QoS operation over radio links, FLUS can offer other advanced functionalities, such as the signaling of immersive media (e.g., virtual reality, augmented reality) over existing networks.

A FLUS source entity and a FLUS sink entity can support point-to-point transmission of speech/audio, video, and text. A FLUS source entity, which may be embodied in a single UE or distributed among a UE and separate audio-visual capture devices, may support all or a subset of the FLUS features. When used as a generic framework, only the F-C procedures (control procedures for source and sink) for establishing the FLUS session need to be supported by the source and sink entities. When offered as part of an IMS/

MTSI service, the source and sink entities should support the IMS control plane and media plane procedures, and the service quality is determined by the MTSI service policy.

As used herein, a FLUS session is a logical association between a source entity and a sink entity within which media content of one or multiple media types (e.g., voice, audio, video) can be sent from the source to the sink. A media session is a subset, or part of, a FLUS session, including the duration to establish the media session, the time period during which media content can be sent from FLUS source to FLUS sink, and the duration to terminate the media session. One or more media sessions may be delivered during a FLUS session. A media stream is the content sent from a FLUS source to a FLUS sink within a media session.

Figure 5:
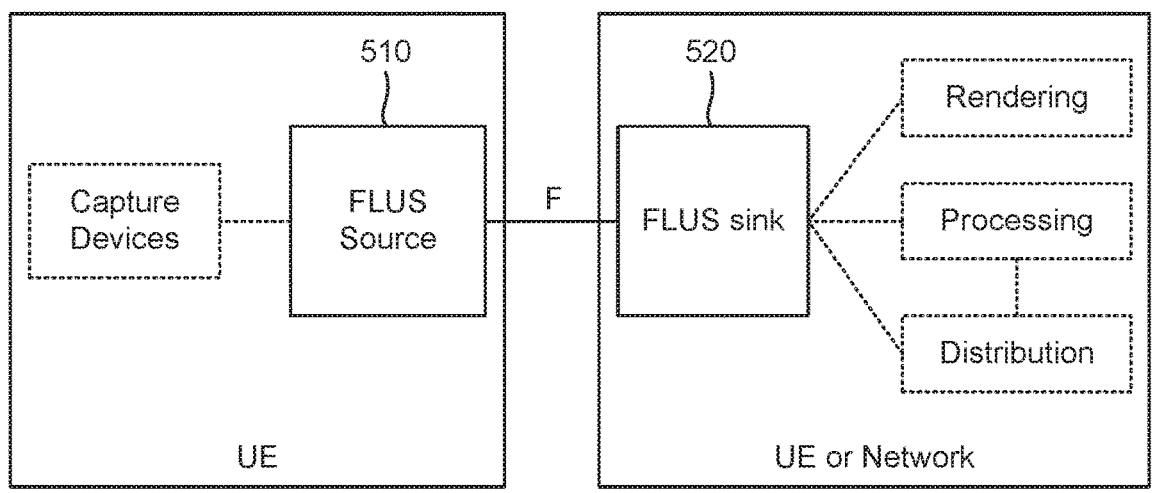
FIG. 5 illustrates an example uplink streaming service architecture, according to various aspects of the disclosure.

FIG. 5 illustrates an example uplink streaming service architecture 500, according to aspects of the disclosure. The uplink streaming service architecture 500 is based on a FLUS source 510 located in a UE (e.g., any of the UEs described herein) and a FLUS sink 520 located in either another UE or in the network. For example, the FLUS sink 520 may be located at a base station (e.g., any of the base stations described herein) or other network entity. The FLUS source 510 receives media content from one or more media capture devices (e.g., camera, microphone, etc.). As used herein, the one or more capture devices are considered as parts of the UE or as connected to it.

When the FLUS sink 520 is located in a UE, the FLUS sink forwards media content to a decoding and rendering function. When the FLUS sink 520 is located in the network, the FLUS sink 520 may forward media content to a processing or distribution sub-function. The FLUS sink 520 may act as a media gateway function (MGW) and/or an application function (AF).

The "F" reference point connects a FLUS source 510 and a FLUS sink 520. The "F" reference point enables the establishment and control of a single FLUS session. The "F" reference point also enables the FLUS sink 520 and the FLUS source 510 to mutually authenticate and authorize each other. The FLUS source 510 and the FLUS sink 520 are each split into a media source and sink (referred to as "F-U" end-points), control source and sink (referred to as "F-C" end-points), remote controller and remote control target (referred to as "F-RC" end-points), and assistance sender and receiver (referred to as "F-A" end-points).

The UE, the FLUS source 510, and the FLUS sink 520 are considered to be logical functions, and as such, are not required to be located in the same physical device; they can be spread over multiple physical devices and interconnected via other interfaces. In addition, multiple F-A and F-RC end-points can exist in a single FLUS source 510. F-A and F-RC end-points are independent of a FLUS sink 520 and depend on the offered service. The "F" reference point supports security functionality for confidentiality protection for all sub-functions.

The FLUS architecture is described in 3GPP Technical Specification (TS) 26.238, which is incorporated herein by reference in its entirety. As such, further details will not be described here for the sake of brevity.

Live uplink media streaming (e.g., FLUS) can be added to and used in an MTSI session. To add FLUS-specific media to an MTSI session and give that FLUS-specific media proper QoS treatment suitable for live uplink streaming instead of regular conversation, there needs to be a means to enable an initiated choice of suitable QoS for the specific usage of FLUS. The initial QoS may be based on different 5G QoS indicator (5QI) and/or QoS class identifier (QCI) values that are attributed for use with live uplink streaming.

For the QoS requirement above, the use of "a=group: FLUS" is not sufficient, since there are at least five defined live uplink streaming 5QIs/QCIs from which to choose. Further, it is assumed that it would neither be desirable nor sufficient for a network operator to always choose a single one of the five FLUS 5QIs/QCIs for a certain media for all FLUS applications, since that would be suitable only for a fraction of the possible FLUS use cases, and sub-optimal at best for the other FLUS use cases. It is also assumed that it would be infeasible to define new, separate applications for the different FLUS use cases, even though being part of the existing MTSI application, to be able to keep the 1:1 mapping approach between 5QI/QCI and the (application, media type) tuple.

As a solution to the issue of insufficient QoS specification, it has been proposed to include a non-authoritative QoS hint (e.g., one or more parameters indicating a desired QoS) for each FLUS-marked media in the session description protocol (SDP) for the FLUS session, taken from a current setting in the FLUS application or set by the end-user of the device that knows the needs of the current use case. This would allow the policy control function (PCF)/policy and charging rules function (PCRF) in the core network to (authoritatively) choose which 5QI/QCI to use, both matching the current user subscription and the current usage of the FLUS device, assuming that the FLUS device itself should be usable with all FLUS use cases (e.g., from ultra-low latency to fairly relaxed but still "live" broadcast latency). This QoS hint may include a "latency" property that may be defined as an ordered list of values, such as "lowest," "low," "medium," "high," and "highest," and a "loss" property that may be similarly defined as an ordered list of values, such as "lowest," "low," "medium," "high," and "highest."

The "loss" value describes the maximum desirable packet loss rate for a FLUS session and may be represented as a percentage by a zero-based integer or a non-zero real value. The "latency" value describes the maximum desirable packet latency for a FLUS session and may be represented in milliseconds (ms) by a zero-based integer or a non-zero real value. Currently, the "loss" value included in an SDP offer represents half the desirable maximum end-to-end packet loss, under the assumption that the SDP offerer (e.g., either the FLUS source or sink) and answerer (e.g., the other of the FLUS source and sink) will share the packet loss budget equally. The "latency" value included in an SDP offer generally represents half the desirable maximum end-to-end packet latency, under the assumption that the offerer and answerer will share the packet latency budget equally.

A "loss" value received in the SDP answer that is identical to the SDP offer is taken as the SDP answerer accepting to share the end-to-end packet loss budget equally, the value being half the resulting maximum end-to-end packet loss. A "loss" value received in the SDP answer that is larger than in the SDP offer is taken as the SDP answerer being incapable of sharing the end-to-end packet loss budget equally, the value in the SDP answer representing the SDP answerer's part, and the resulting total maximum end-to-end loss hint being equal to the sum of the "loss" parameters from the SDP offer and the SDP answer.

A "latency" value received in the SDP answer that is identical to the SDP offer is taken as the SDP answerer accepting to share the end-to-end packet latency budget equally, the value being half of the resulting maximum end-to-end packet latency. A "latency" value received in the SDP answer that is larger than in the SDP offer is taken as the SDP answerer being incapable of sharing the end-to-end packet latency budget equally, the value in the SDP answer representing the SDP answerer's part, and the resulting total maximum end-to-end latency hint being equal to the sum of the "latency" parameters from the SDP offer and the SDP answer.

Based on the loss and latency parameters in the QoS hint exchanged between the offeror and answerer during an SDP session, the network assigns an appropriate QoS treament, i.e., an appropriate QCI/5QI.

This QoS hint solution can be used across all services that provide uplink streaming services, such as FLUS and MTSI. This solution can even be extended to services where particular loss and latency requirements can vary significantly, such as conversational virtual reality and/or augmented reality, telepresence, split rendering, cloud rendering, etc. As such, it is important to consider how the QoS hint might be used more generically for these other, and future, services.

When the SDP offerer proposes a certain QoS, it may choose the QoS based on the user's subscription, the type/quality of the service being provided (e.g., breaking news reporting versus live streaming on a social network), and the link requirements of the offerer in order to provide a particular quality of experience (e.g., speech quality). This last factor (i.e., the link loss rate needed to achieve a particular voice quality) is based on the UE's implementation of functions, such as the JBM and PLC. Even if the UE were part of the same mobile network operator's (MNO's) network, this variation in implementation could require different target loss rates to achieve the same voice quality. This consideration has been addressed by allowing the media receiver to indicate the maximum e2e PLR that it can handle based on its particular implementation.

In some cases, an SDP answerer might need more stringent latency than offered, for example, if the UE's receiving-decoding-rendering processing chain, including the lack of asynchronous time warp/local re-projection functionality, needs more time to render media within an end-to-end target latency for more delay-sensitive services. There may also be scenarios where an offerer does not request the most stringent QoS allowed by its subscription. For example, a UE and its subscription may be able to support semi-professional grade news reporting while also supporting a social video sharing application. Or a virtual reality head-mounted display (HMD) may support both cloud rendering and split rendering, each of which can have very different latency requirements. In such scenarios, the answerer may be able to negotiate a QoS level that is allowed by the offerer's subscription and more stringent than what it had offered. As such, there should be the ability for an answerer to indicate the need for a more stringent QoS than what was offered.

When the FLUS sink is located in the core network and there is no wireless link between the gNB/eNB and the FLUS sink (i.e., there is a wireline connection between the gNB/eNB and the FLUS sink), the loss over that link can be considered essentially zero and the latency can be considered very low, if not zero. It may be beneficial for the FLUS sink to be able to indicate this very low loss/latency in the SDP answer for appropriate QoS resources to be reserved on the radio link to the FLUS source (i.e., the radio link between the UE as FLUS source and the serving base station). Also, if there are use cases where the network FLUS sink sends an SDP offer, it would also be beneficial to be able to indicate this very low loss/latency in the offer.

Even for non-FLUS services, there may be other scenarios where one of the links in an end-to-end path could have very low loss/latency that should be properly indicated to the network so that any radio QoS reservations can be made efficiently. Such scenarios may include, for example, MTSI or conversational AR/VR sessions where one of the terminals is connected via wireline or a very low loss/latency connection.

There are various solutions to the issue of the SDP answerer needing to request more stringent QoS. As a first solution, as described above, the QoS hint may be for half of the desirable maximum end-to-end loss/latency. In that solution, as described above, the "loss" value included in an SDP offer represents half the desirable maximum end-to-end packet loss, under the assumption that the offerer and answerer will share the packet loss budget equally. Similarly, the "latency" value included in an SDP offer represents half the desirable maximum end-to-end packet latency, under the assumption that the offerer and answerer will share the packet latency budget equally.

However, while this solution provides the option for the answerer to request a higher loss/latency value than what is offered, it does not provide the option for the answerer to request a lower loss/latency value. This means the end-to-end loss/latency will need to be at least twice what was offered. Even if it were possible to modify this solution to allow the answerer to request a lower loss/latency value than offered, the lowest loss/latency that can be requested by the answerer is zero, which would prevent the end-to-end loss/latency from being any lower than what was offered. For example, an SDP offeror (e.g., a FLUS sink) may offer a latency of 50 ms on its radio link, but that may not be good enough for the SDP answerer (e.g., a FLUS source), which may need, for example, an end-to-end latency of 30 ms. Even if the answerer reduces its latency to 0 (which is unlikely to be possible), the end-to-end latency will still be 50 ms. Under this solution, there is no way for the answerer to indicate to the offeror that it needs better latency.

Another challenge to this approach is addressing the issue of insufficient QoS in the offer. If the FLUS source sends the offer, it can cause overly stringent QoS allocation. For example, when the FLUS source sends an offer with half its desired end-to-end loss/latency, and the network FLUS sink responds with an approximately zero loss/latency, the resulting total end-to-end loss/latency will be half of what the FLUS source needed (since the FLUS source asked for half of what it needed). If the PCRF/PCF only looks at the loss/latency value in the offer (from the FLUS source on its network), it could select a QoS treatment that is overly stringent.

Also, if the network FLUS sink sends an offer, and the offer indicates a very low loss/latency, it would appear that it is encouraging the FLUS source (the answerer) to try to match this very low value for its own radio link. This could put an unnecessarily stringent QoS requirement on the radio link of the FLUS source, when in fact, it could be even less stringent because the FLUS sink is not introducing any significant loss or latency. As such, it is unclear how a network FLUS sink can indicate very low loss/latency and encourage the FLUS source to exploit this with a more relaxed QoS on its radio link.

To address at least some of these issues, the answerer can reject the SDP INVITE that includes the offer and then send a new offer with a lower loss/latency to meet its requirements. However, having the answerer reject the offer and then send a re-offer may not be acceptable in some scenarios. For example, if the offerer was a FLUS source and the answerer was a FLUS sink (in the network or another UE), having the FLUS sink reject an offer and then make an offer to receive a FLUS stream is a questionable use case.

Another approach is for the answerer to reject the INVITE with an SDP 488 (Not Acceptable Here) message and include the desired (more stringent) QoS loss/latency. This would provide the offeror an indication of what QoS hint values to include in a re-offer. However, this would still have some of the disadvantages described above.

Accordingly, the present disclosure provides techniques to enable a FLUS sink and source to negotiate the end-to-end loss/latency via SDP. In an aspect, the definitions of "loss" and "latency" could be modified to have these SDP attributes represent the end-to-end loss/latency as follows. The "loss" value included in an SDP offer may represent the desirable maximum end-to-end packet loss, under the assumption that the offeror and answerer will share the packet loss budget equally. The "latency" value included in an SDP offer may represent the desirable maximum end-to-end packet latency, under the assumption that the offeror and answerer will share the packet latency budget equally. In an aspect, the loss value may describe the maximum desirable packet loss rate in percent (but without a "%" sign) as a zero-based integer or as a non-zero real value. The latency value may describe the maximum desirable packet latency in milliseconds, for example, as a zero-based integer or as a non-zero real value. Based on these values, the network (e.g., PCF/PCRF) can use half the end-to-end loss/latency to select an appropriate QoS treatment (e.g., QCI/5QI) for each radio link (i.e., the radio link for the FLUS source and the radio link for the FLUS sink, where both are UEs).

In some cases, there may still be an issue when a network FLUS sink sends an SDP answer in response to an offer from the FLUS source. For example, in a first case, the FLUS sink may respond with an end-to-end loss latency value that is twice what was offered by the FLUS source because it understands that its link will introduce negligible loss/latency and that the PCF/PCRF will use half of the end-to-end latency when selecting a QCI/5QI. However, if the offering FLUS source thinks that twice the loss/latency it offered is unacceptable for the service, it may terminate the session. As another example, in a second case, the FLUS sink may respond with an end-to-end loss latency value that is equal to what was offered by the FLUS source. In this case, the PCRF/PCF will choose too stringent a QCI/5QI to meet half of the offered loss/latency.

Similar issues can arise if the network FLUS sink sends an SDP offer. For example, as a first case, the FLUS sink can set the end-to-end loss/latency to what is actually desired by the service. However, when the PCF/PCRF sees this, it will not understand that the FLUS sink introduces negligible loss/latency and will choose an unnecessarily stringent QCI/5QI, specifically, half the end-to-end loss/latency. As another example, in a second case, the FLUS sink can set the end-to-end loss/latency to twice what is actually desired by the service. This would allow the PCF/PCRF to choose an appropriate QCI/5QI, that is, half of twice the desired loss/latency. However, it is possible that the answering client may decide that the (double) loss/latency in the SDP offer is too high and try to lower the end-to-end value in the SDP answer. This would result in the same overly stringent QoS reservation for the radio link as described in the first case.

As such, in some cases, there may still be a need for a network FLUS sink to indicate to the PCF/PCRF that the network can allocate the entire end-to-end loss/latency to the radio link between the FLUS source and the base station, and thereby, there is no reliable means to avoid overly stringent QCI/5QIs being selected for the radio link.

Accordingly, the present disclosure provides additional techniques for a FLUS source and sink to negotiate end-to-end and per link loss/latency via SDP. In an aspect, in addition to the solution described above, optional parameters can be defined that would allow the offerer and answerer to indicate how to distribute the end-to-end loss/latency across their radio links.

In an aspect, the QoS hint may include an uplink hint value and a downlink hint value. The uplink hint value indicates the desired loss/latency on the offeror's/answerer's uplink, and the downlink hint value indicates the desired loss/latency on the offeror's/answerer's downlink. In this way, a network FLUS sink can use these optional uplink/downlink parameters to explicitly indicate the approximately zero loss/latency on its link, thereby enabling the network to allocate the entire desired loss/latency to the UE FLUS source. For example, a network FLUS sink may offer/answer with a downlink hint value of "0" (to indicate the near-zero loss/latency of its backhaul link from the base station to the FLUS sink). It may also optionally include an uplink hint value to be applied to the backhaul link between the FLUS sink and the base station in case traffic is expected to be sent in this direction (e.g., TCP acknowledgments (ACKs) sent opposite the direction of the media transmission being transported over TCP). The UE FLUS source, in its offer/answer, may specify an end-to-end loss/latency or a specific uplink loss/latency and, optionally, a downlink loss/latency. The network can then allocate the entire loss/latency to the UE FLUS source's radio link, and none to the network FLUS sink.

The uplink and downlink values are independently optional. That is, it is not necessary to provide both in a pair. This is to allow for the following two scenarios: 1) the offeror or answerer does not have any preference for one of the transmission directions, and/or 2) the QoS hint is used in a uni-directional "sendonly" or "recvonly" stream, and therefore, setting either the uplink or downlink values would be meaningless. For example, for an uplink-only stream where no traffic is sent on the UEs downlink, the FLUS source does not care about, and therefore does not need to specify, the downlink parameters for the FLUS sink.

In an aspect, the uplink hint value is the value of the QoS hint on the offerer's/answerer's uplink, and may be represented by a zero-based integer, a non-zero real number, or a token (e.g., an index value or a value to be extended later). The downlink hint is the value of the QoS hint on the offerer's/answerer's downlink, and may be preresented by a zero-based integer, a non-zero real number, or a token (e.g., an index value or a value to be extended later).

Note that the above-described QoS hint parameters should only occur once in the offer/answer. If a QoS hint parameter is not included, it should be interpreted as the UE and application having no preference for any QoS value for that QoS hint parameter, and anything the network can provide is equally acceptable.

Figure 6:
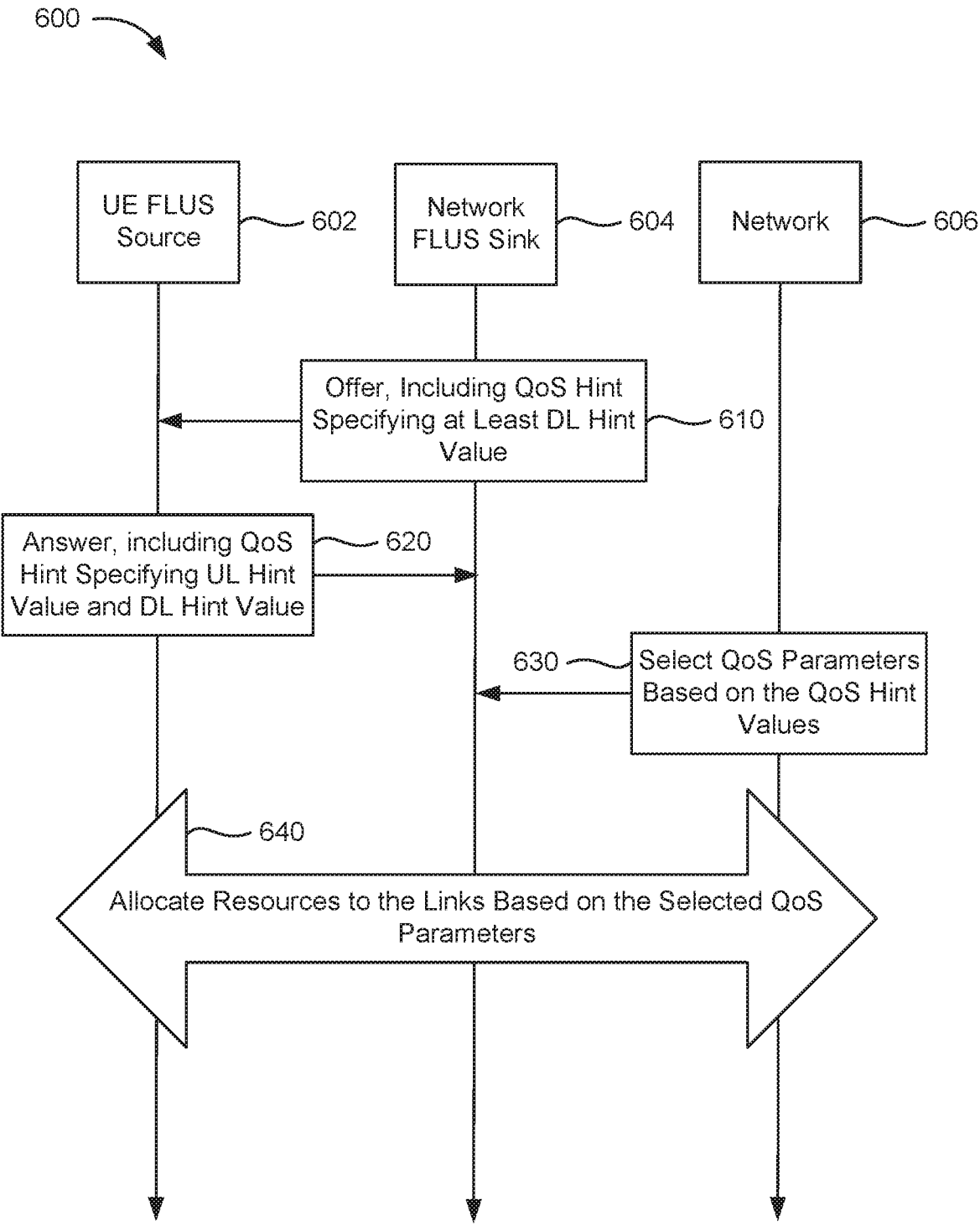
FIGS. 6 to 8 illustrate example methods of wireless communication, according to various aspects of the disclosure.

FIG. 6 illustrates an example call flow 600 between a UE FLUS source 602 and a network FLUS sink 604, according to aspects of the disclosure. The UE FLUS source 602 may correspond to any of the UEs described herein, and the network FLUS sink 604 may correspond to a base station (e.g., any of the base stations described herein), an entity of the core network, an application server (e.g., application server 172), a remote client, or the like. In the example of FIG. 6, the network FLUS sink 604 is the SDP offeror and the UE FLUS source 602 is the SDP answerer, but as will be appreciated, these roles may be reversed.

At 610, the network FLUS sink 604 sends an SDP offer to the UE FLUS source 602. Because the offeror is a network FLUS sink, the offer may include at least a downlink loss/latency QoS hint value, instead of or in addition to end-to-end loss/latency QoS hint values. The downlink loss/latency QoS hint values may be "0" to indicate the negligible loss/latency on the backhaul link between the base station (not shown) serving the UE FLUS source 602 and the network FLUS sink 604. The offer may also include an uplink loss/latency QoS hint value of zero for the backhaul link between the FLUS sink 604 and the serving base station if traffic (e.g., TCP ACKs) is expected to also be sent in this direction.

At 620, the UE FLUS source 602 sends an answer to the network FLUS sink 604. In SDP, to accept the offer, the answer needs to include the same attributes that were in the offer. If the answerer (i.e., the UE FLUS source 602) accepts the end-to-end loss/latency in the offer, then it can include this value in the answer and also include an uplink loss/latency QoS hint value equal to the end-to-end loss/latency since the backhaul downlink to the network FLUS sink 604 will not introduce any loss/latency.

The answer may also include downlink loss/latency QoS hint values for the radio link between the serving base station (not shown) and the UE FLUS sink 604 if the offer indicated that there might be traffic in that direction. In this case, the answer would indicate that the downlink loss/latency is equal to the end-to-end loss latency since the uplink on the backhaul from the network FLUS sink 604 to the serving base station is zero. If the offer did not include an uplink loss/latency QoS hint value, then the UE FLUS source 602 can include the hint and its preferred values in the answer.

Alternatively, if the offer included end-to-end loss/latency QoS hint values and downlink loss/latency QoS hint values, the UE FLUS source 602 can derive the offered uplink loss/latency QoS hint values and decide whether or not to accept them. If the UE FLUS source 602 accepts them, it can answer with the offered end-to-end loss/latency QoS hint values and uplink/downlink parameter values as described earlier. If it does not accept them, it can answer with different end-to-end loss/latency QoS hint values and different uplink/downlink parameter values.

The network FLUS sink 604 and the UE FLUS source 602 may repeat operations 610 and 620 until they agree on the loss/latency QoS hint values. Alternatively, even if they do not agree, they may perform operations 610 and 620 only once.

At 630, the network 606 (e.g., the PCF/PCRF) selects a Q5I/QCI based, at least in part, on the loss/latency QoS hint values. If the UE FLUS source 602 and downlink loss/latency QoS hint value agreed on the loss/latency QoS hint values, the network 606 may select the Q5I/QCI that best matches the agreed values.

At 640, the network 606 allocates resources to the connection between the UE FLUS source 602 and the network FLUS sink 604, in particular, the radio link between the UE FLUS source 602 and its serving base station. Once the link is established with the selected Q5I/QCI, the UE FLUS source 602 can begin streaming uplink media to the network FLUS sink 604.

Figure 7:
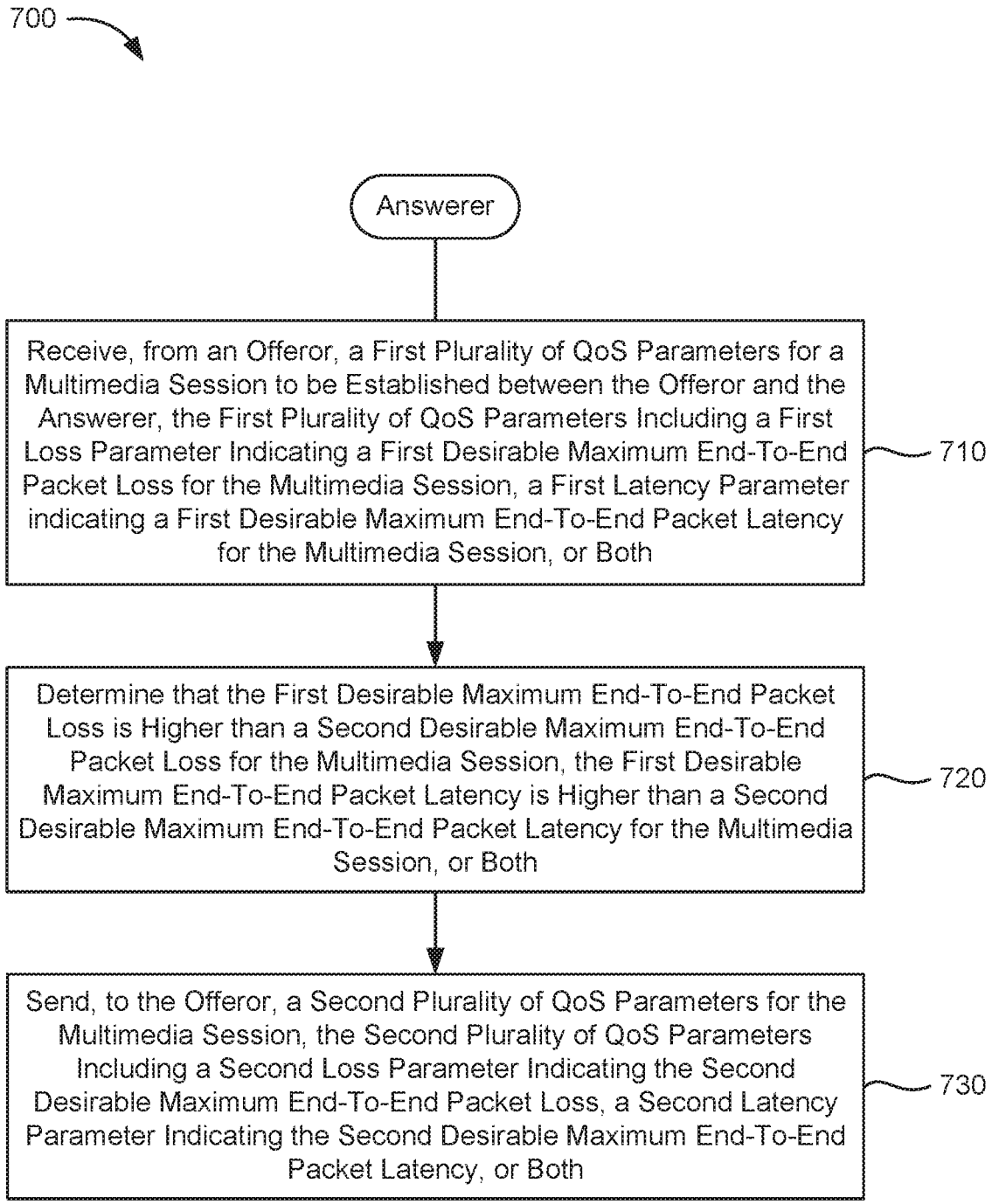

FIG. 7 illustrates an example method 700 of wireless communication, according to aspects of the disclosure. The method 700 may be performed by an SDP answerer (e.g., a FLUS source/sink).

At 710, the answerer receives, from an offeror (e.g., a FLUS source/sink), a first plurality of QoS parameters for a multimedia session (e.g., a FLUS session) to be established between the offeror and the answerer, as at 610 of FIG. 6. In an aspect, the first plurality of QoS parameters include a first loss parameter indicating a first desirable maximum end-to-end packet loss for the multimedia session, a first latency parameter indicating a first desirable maximum end-to-end packet latency for the multimedia session, or both. In an aspect, where the answerer is a UE, operation 710 may be performed by WWAN transceiver 310, processing system 332, memory component 340, and/or uplink streaming service component 342, any or all of which may be considered means for performing this operation. In an aspect, where the answerer is a base station, operation 710 may be performed by WWAN transceiver 350, processing system 384, memory component 386, and/or uplink streaming service component 388, any or all of which may be considered means for performing this operation. In an aspect, where the answerer is a network entity, operation 710 may be performed by network interface(s) 390, processing system 394, memory component 396, and/or QoS allocation component 398, any or all of which may be considered means for performing this operation.

At 720, the answerer determines that the first desirable maximum end-to-end packet loss is higher than a second desirable maximum end-to-end packet loss for the multimedia session, the first desirable maximum end-to-end packet latency is higher than a second desirable maximum end-to-end packet latency for the multimedia session, or both. In an aspect, where the answerer is a UE, operation 720 may be performed by WWAN transceiver 310, processing system 332, memory component 340, and/or uplink streaming service component 342, any or all of which may be considered means for performing this operation. In an aspect, where the answerer is a base station, operation 720 may be performed by WWAN transceiver 350, processing system 384, memory component 386, and/or uplink streaming service component 388, any or all of which may be considered means for performing this operation. In an aspect, where the answerer is a network entity, operation 720 may be performed by network interface(s) 390, processing system 394, memory component 396, and/or QoS allocation component 398, any or all of which may be considered means for performing this operation.

At 730, the answerer sends, to the offeror, a second plurality of QoS parameters for the multimedia session, as at 620 of FIG. 6. In an aspect, the second plurality of QoS parameters include a second loss parameter indicating the second desirable maximum end-to-end packet loss, a second latency parameter indicating the second desirable maximum end-to-end packet latency, or both. In an aspect, where the answerer is a UE, operation 730 may be performed by WWAN transceiver 310, processing system 332, memory component 340, and/or uplink streaming service component 342, any or all of which may be considered means for performing this operation. In an aspect, where the answerer is a base station, operation 730 may be performed by WWAN transceiver 350, processing system 384, memory component 386, and/or uplink streaming service component 388, any or all of which may be considered means for performing this operation. In an aspect, where the answerer is a network entity, operation 730 may be performed by network interface(s) 390, processing system 394, memory component 396, and/or QoS allocation component 398, any or all of which may be considered means for performing this operation.

Figure 8:
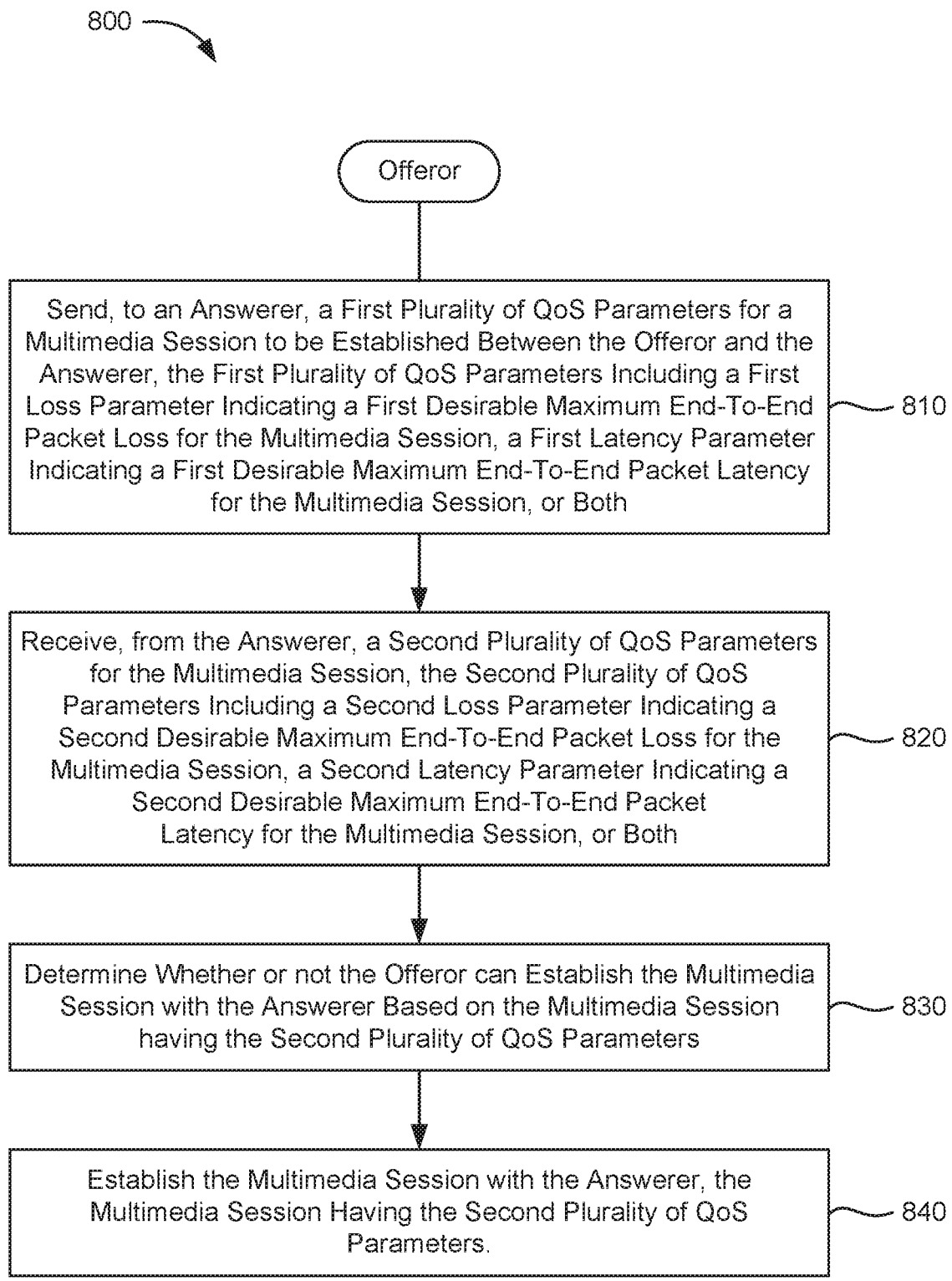

FIG. 8 illustrates an example method 800 of wireless communication, according to aspects of the disclosure. The method 800 may be performed by an offeror (e.g., a FLUS source/sink).

At 810, the offeror sends, to an answerer (e.g., a FLUS source/sink), a first plurality of QoS parameters for a multimedia session to be established between the offeror and the answerer, as at 610 of FIG. 6. In an aspect, the first plurality of QoS parameters include a first loss parameter indicating a first desirable maximum end-to-end packet loss for the multimedia session, a first latency parameter indicating a first desirable maximum end-to-end packet latency for the multimedia session, or both. In an aspect, where the offeror is a UE, operation 810 may be performed by WWAN transceiver 310, processing system 332, memory component 340, and/or uplink streaming service component 342, any or all of which may be considered means for performing this operation. In an aspect, where the offeror is a base station, operation 810 may be performed by WWAN transceiver 350, processing system 384, memory component 386, and/or uplink streaming service component 388, any or all of which may be considered means for performing this operation. In an aspect, where the offeror is a network entity, operation 810 may be performed by network interface(s) 390, processing system 394, memory component 396, and/or QoS allocation component 398, any or all of which may be considered means for performing this operation.

At 820, the offeror receives, from the answerer, a second plurality of QoS parameters for the multimedia session, as at 620 of FIG. 6. In an aspect, the second plurality of QoS parameters include a second loss parameter indicating a second desirable maximum end-to-end packet loss for the multimedia session, a second latency parameter indicating a second desirable maximum end-to-end packet latency for the multimedia session, or both. In an aspect, where the offeror is a UE, operation 820 may be performed by WWAN transceiver 310, processing system 332, memory component 340, and/or uplink streaming service component 342, any or all of which may be considered means for performing this operation. In an aspect, where the offeror is a base station, operation 820 may be performed by WWAN transceiver 350, processing system 384, memory component 386, and/or uplink streaming service component 388, any or all of which may be considered means for performing this operation. In an aspect, where the offeror is a network entity, operation 820 may be performed by network interface(s) 390, processing system 394, memory component 396, and/or QoS allocation component 398, any or all of which may be considered means for performing this operation.

At 830, the offeror determines whether or not the offeror can establish the multimedia session with the answerer based on the multimedia session having the second plurality of QoS parameters. In an aspect, where the offeror is a UE, operation 830 may be performed by WWAN transceiver 310, processing system 332, memory component 340, and/or uplink streaming service component 342, any or all of which may be considered means for performing this operation. In an aspect, where the offeror is a base station, operation 830 may be performed by WWAN transceiver 350, processing system 384, memory component 386, and/or uplink streaming service component 388, any or all of which may be considered means for performing this operation. In an aspect, where the offeror is a network entity, operation 830 may be performed by network interface(s) 390, processing system 394, memory component 396, and/or QoS allocation component 398, any or all of which may be considered means for performing this operation.

At 840, the offeror establishes the multimedia session with the answerer, the multimedia session having the second plurality of QoS parameters. In an aspect, where the offeror is a UE, operation 840 may be performed by WWAN transceiver 310, processing system 332, memory component 340, and/or uplink streaming service component 342, any or all of which may be considered means for performing this operation. In an aspect, where the offeror is a base station, operation 840 may be performed by WWAN transceiver 350, processing system 384, memory component 386, and/or uplink streaming service component 388, any or all of which may be considered means for performing this operation. In an aspect, where the offeror is a network entity, operation 840 may be performed by network interface(s) 390, processing system 394, memory component 396, and/or QoS allocation component 398, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by an answerer, comprising:
   receiving, from an offeror, an offer including a first plurality of quality of service (QOS) parameters for a multimedia session to be established between the offeror and the answerer, the first plurality of QoS parameters including a first latency parameter indicating a first desirable maximum end-to-end packet latency for the multimedia session in milliseconds, the first plurality of QoS parameters received in a first session description protocol (SDP) message;
   determining that the first desirable maximum end-to-end packet latency is higher than a second desirable maximum end-to-end packet latency for the multimedia session; and
   sending, to the offeror, an answer including a second plurality of QoS parameters for the multimedia session, the second plurality of QoS parameters including a second latency parameter indicating the second desirable maximum end-to-end packet latency in milliseconds, the second plurality of QoS parameters sent in a second SDP message,
   wherein (1) the offeror is a user equipment (UE) that originates the offer and the answerer is a non-UE network node that originates the answer, or (2) the offeror is the non-UE network node that originates the offer and the answerer is the UE that originates the answer, and
   wherein the multimedia session comprises a FLUS session, a multimedia telephony service for internet protocol (IP) multimedia subsystem (IMS) (MTSI) session, an extended reality session, a telepresence session, or a split rendering session.

2. The method of claim 1, wherein the second plurality of QoS parameters further include one or more values indicating how to distribute the second desirable maximum end-to-end packet latency across a communication link between the answerer and the offeror.

3. The method of claim 2, wherein the second plurality of QoS parameters further include an uplink value indicating how to distribute the second desirable maximum end-to-end packet latency across an uplink communication link of the answerer.

4. The method of claim 3, wherein:
   the answerer comprises a framework for live uplink streaming (FLUS) source and the offeror comprises a FLUS sink, or
   the answerer comprises a FLUS sink and the offeror comprises a FLUS source.

5. The method of claim 2, wherein the second plurality of QoS parameters further include a downlink value indicating how to distribute the first desirable maximum end-to-end packet latency across a downlink communication link of the answerer.

6. The method of claim 5, wherein:
   the answerer comprises a FLUS sink and the offeror comprises a FLUS source, or
   the answerer comprises a FLUS source and the offeror comprises a FLUS sink.

7. The method of claim 1, wherein the first plurality of QoS parameters further include one or more values indicating how to distribute the first desirable maximum end-to-end packet latency across a communication link between the offeror and the answerer.

8. The method of claim 1, wherein the first plurality of QoS parameters further include a downlink value indicating how to distribute the first desirable maximum end-to-end packet latency across a downlink communication link of the offeror.

9. The method of claim 8, wherein:
   the offeror comprises a FLUS sink and the answerer comprises a FLUS source, or
   the offeror comprises a FLUS source and the answerer comprises a FLUS sink.

10. The method of claim 1, wherein the first plurality of QoS parameters further include an uplink value indicating how to distribute the first desirable maximum end-to-end packet latency across an uplink communication link of the offeror.

11. The method of claim 10, wherein:
    the offeror comprises a FLUS source and the answerer comprises a FLUS sink, or the offeror comprises a FLUS sink and the answerer comprises a FLUS source.

12. The method of claim 1, further comprising:
    receiving, from the offeror, an acceptance of the second plurality of QoS parameters for the multimedia session; and
    establishing the multimedia session with the offeror based on reception of the acceptance.

13. The method of claim 1, further comprising:
receiving, from the offeror, a rejection of the second plurality of QoS parameters for the multimedia session; and
dropping the multimedia session with the offeror based on reception of the rejection.

14. A method of wireless communication performed by an offeror, comprising:
sending, to an answerer, an offer including a first plurality of quality of service (QOS) parameters for a multimedia session to be established between the offeror and the answerer, the first plurality of QoS parameters including a first latency parameter indicating a first desirable maximum end-to-end packet latency for the multimedia session in milliseconds, the first plurality of QoS parameters sent in a first session description protocol (SDP) message;
receiving, from the answerer, an answer including a second plurality of QoS parameters for the multimedia session, the second plurality of QoS parameters including a second latency parameter indicating a second desirable maximum end-to-end packet latency for the multimedia session in milliseconds, the second plurality of QoS parameters received in a second SDP message;
determining whether or not the offeror can establish the multimedia session with the answerer based on the multimedia session having the second plurality of QoS parameters; and
establishing the multimedia session with the answerer, the multimedia session having the second plurality of QoS parameters,
wherein (1) the offeror is a user equipment (UE) that originates the offer and the answerer is a non-UE network node that originates the answer, or (2) the offeror is the non-UE network node that originates the offer and the answerer is the UE that originates the answer, and
wherein the multimedia session comprises a FLUS session, a multimedia telephony service for internet protocol (IP) multimedia subsystem (IMS) (MTSI) session, an extended reality session, a telepresence session, or a split rendering session.

15. The method of claim 14, wherein the second plurality of QoS parameters further include one or more values indicating how to distribute the second desirable maximum end-to-end packet latency across a communication link between the answerer and the offeror.

16. The method of claim 15, wherein the second plurality of QoS parameters further include an uplink value indicating how to distribute the second desirable maximum end-to-end packet latency across an uplink communication link of the answerer.

17. The method of claim 16, wherein:
the answerer comprises a framework for live uplink streaming (FLUS) source and the offeror comprises a FLUS sink, or
the answerer comprises a FLUS sink and the offeror comprises a FLUS source.

18. The method of claim 15, wherein the second plurality of QoS parameters further include a downlink value indicating how to distribute the first desirable maximum end-to-end packet latency across a downlink communication link of the answerer.

19. The method of claim 18, wherein:
the answerer comprises a FLUS sink and the offeror comprises a FLUS source, or
the answerer comprises a FLUS source and the offeror comprises a FLUS sink.

20. The method of claim 14, wherein the first plurality of QoS parameters further include an uplink value and a downlink value indicating how to distribute the first desirable maximum end-to-end packet latency across a communication link between the offeror and the answerer.

21. The method of claim 14, wherein the first plurality of QoS parameters further include a downlink value indicating how to distribute the first desirable maximum end-to-end packet latency across a downlink communication link of the offeror.

22. The method of claim 21, wherein:
the offeror comprises a FLUS sink and the answerer comprises a FLUS source, or
the offeror comprises a FLUS source and the answerer comprises a FLUS sink.

23. The method of claim 14, wherein the first plurality of QoS parameters further include an uplink value indicating how to distribute the first desirable maximum end-to-end packet latency across an uplink communication link of the offeror.

24. The method of claim 23, wherein:
the offeror comprises a FLUS source and the answerer comprises a FLUS sink, or
the offeror comprises a FLUS sink and the answerer comprises a FLUS source.

25. The method of claim 14, further comprising:
sending, to the answerer, an acceptance of the second plurality of QoS parameters for the multimedia session.

26. An answerer apparatus, comprising:
a memory;
a communication device; and
one or more processors communicatively coupled to the memory and the communication device, the one or more processors configured to:
receive, from an offeror apparatus, an offer including a first plurality of quality of service (QOS) parameters for a multimedia session to be established between the offeror and the answerer apparatus, the first plurality of QoS parameters including a first latency parameter indicating a first desirable maximum end-to-end packet latency for the multimedia session in milliseconds, the first plurality of QoS parameters received in a first session description protocol (SDP) message;
determine that the first desirable maximum end-to-end packet latency is higher than a second desirable maximum end-to-end packet latency for the multimedia session; and
cause the communication device to send, to the offeror apparatus, an answer including a second plurality of QoS parameters for the multimedia session, the second plurality of QoS parameters including a second latency parameter indicating the second desirable maximum end-to-end packet latency in milliseconds, the second plurality of QoS parameters sent in a second SDP message,
wherein (1) the offeror apparatus is a user equipment (UE) that originates the offer and the answerer apparatus is a non-UE network node that originates the answer, or (2) the offeror apparatus is the non-UE network node that originates the offer and the answerer apparatus is the UE that originates the answer, and
wherein the multimedia session comprises a FLUS session, a multimedia telephony service for internet protocol (IP) multimedia subsystem (IMS) (MTSI) session, an extended reality session, a telepresence session, or a split rendering session.

27. The answerer apparatus of claim 26, wherein the second plurality of QoS parameters further include one or more values indicating how to distribute the second desirable maximum end-to-end packet latency across a communication link between the answerer apparatus and the offeror apparatus.

28. The answerer apparatus of claim 27, wherein the second plurality of QoS parameters further include an uplink value indicating how to distribute the second desirable maximum end-to-end packet latency across an uplink communication link of the answerer apparatus.

29. The answerer apparatus of claim 28, wherein:
the answerer apparatus comprises a framework for live uplink streaming (FLUS) source and the offeror apparatus comprises a FLUS sink, or
the answerer apparatus comprises a FLUS sink and the offeror apparatus comprises a FLUS source.

30. The answerer apparatus of claim 27, wherein the second plurality of QoS parameters further include a downlink value indicating how to distribute the first desirable maximum end-to-end packet latency across a downlink communication link of the answerer apparatus.

31. The answerer apparatus of claim 30, wherein:
the answerer apparatus comprises a FLUS sink and the offeror apparatus comprises a FLUS source, or
the answerer apparatus comprises a FLUS source and the offeror apparatus comprises a FLUS sink.

32. The answerer apparatus of claim 26, wherein the first plurality of QoS parameters further include one or more values indicating how to distribute the first desirable maximum end-to-end packet latency across a communication link between the offeror apparatus and the answerer apparatus.

33. The answerer apparatus of claim 26, wherein the first plurality of QoS parameters further include a downlink value indicating how to distribute the first desirable maximum end-to-end packet latency across a downlink communication link of the offeror apparatus.

34. The answerer apparatus of claim 33, wherein:
the offeror apparatus comprises a FLUS sink and the answerer apparatus comprises a FLUS source, or
the offeror apparatus comprises a FLUS source and the answerer apparatus comprises a FLUS sink.

35. The answerer apparatus of claim 26, wherein the first plurality of QoS parameters further include an uplink value indicating how to distribute the first desirable maximum end-to-end packet latency across an uplink communication link of the offeror apparatus.

36. The answerer apparatus of claim 35, wherein:
the offeror apparatus comprises a FLUS source and the answerer apparatus comprises a FLUS sink, or
the offeror apparatus comprises a FLUS sink and the answerer apparatus comprises a FLUS source.

37. The answerer apparatus of claim 26, wherein:
the offeror apparatus is the UE and the answerer apparatus is the non-UE network node, and
the communication device comprises at least one network interface.

38. The answerer apparatus of claim 26, wherein:
the offeror apparatus is the non-UE network node and the answerer apparatus is the UE, and
the communication device comprises at least one transceiver.

39. The answerer apparatus of claim 26, wherein the one or more processors are further configured to:

receive, from the offeror apparatus, an acceptance of the second plurality of QoS parameters for the multimedia session; and
establish the multimedia session with the offeror apparatus based on reception of the acceptance.

40. The answerer apparatus of claim 26, wherein the one or more processors are further configured to:
receive, from the offeror apparatus, a rejection of the second plurality of QoS parameters for the multimedia session; and
drop the multimedia session with the offeror apparatus based on reception of the rejection.

41. An offeror apparatus, comprising:
a memory;
a communication device; and
one or more processors communicatively coupled to the memory and the communication device, the one or more processors configured to:
cause the communication device to send, to an answerer apparatus, an offer including a first plurality of quality of service (QOS) parameters for a multimedia session to be established between the offeror apparatus and the answerer apparatus, the first plurality of QoS parameters including a first latency parameter indicating a first desirable maximum end-to-end packet latency for the multimedia session in milliseconds, the first plurality of QoS parameters sent in a first session description protocol (SDP) message;
receive, from the answerer apparatus, an answer including a second plurality of QoS parameters for the multimedia session, the second plurality of QoS parameters including a second latency parameter indicating a second desirable maximum end-to-end packet latency for the multimedia session in milliseconds, the second plurality of QoS parameters received in a second SDP message;
determine whether or not the offeror apparatus can establish the multimedia session with the answerer apparatus based on the multimedia session having the second plurality of QoS parameters; and
establish the multimedia session with the answerer apparatus, the multimedia session having the second plurality of QoS parameters,
wherein (1) the offeror apparatus is a user equipment (UE) that originates the offer and the answerer apparatus is a non-UE network node that originates the answer, or (2) the offeror apparatus is the non-UE network node that originates the offer and the answerer apparatus is the UE that originates the answer, and
wherein the multimedia session comprises a FLUS session, a multimedia telephony service for internet protocol (IP) multimedia subsystem (IMS) (MTSI) session, an extended reality session, a telepresence session, or a split rendering session.

42. The offeror apparatus of claim 41, wherein the second plurality of QoS parameters further include one or more values indicating how to distribute the second desirable maximum end-to-end packet latency across a communication link between the answerer apparatus and the offeror apparatus.

43. The offeror apparatus of claim 42, wherein the second plurality of QoS parameters further include an uplink value indicating how to distribute the second desirable maximum end-to-end packet latency across an uplink communication link of the answerer apparatus.

44. The offeror apparatus of claim 43, wherein:
the answerer apparatus comprises a framework for live uplink streaming (FLUS) source and the offeror apparatus comprises a FLUS sink, or
the answerer apparatus comprises a FLUS sink and the offeror apparatus comprises a FLUS source.

45. The offeror apparatus of claim 42, wherein the second plurality of QoS parameters further include a downlink value indicating how to distribute the first desirable maximum end-to-end packet latency across a downlink communication link of the answerer apparatus.

46. The offeror apparatus of claim 45, wherein:
the answerer apparatus comprises a FLUS sink and the offeror apparatus comprises a FLUS source, or
the answerer apparatus comprises a FLUS source and the offeror apparatus comprises a FLUS sink.

47. The offeror apparatus of claim 41, wherein the first plurality of QoS parameters further include an uplink value and a downlink value indicating how to distribute the first desirable maximum end-to-end packet latency across a communication link between the offeror and the answerer apparatus.

48. The offeror apparatus of claim 41, wherein the first plurality of QoS parameters further include a downlink value indicating how to distribute the first desirable maximum end-to-end packet latency across a downlink communication link of the offeror apparatus.

49. The offeror apparatus of claim 48, wherein:
the offeror apparatus comprises a FLUS sink and the answerer apparatus comprises a FLUS source, or
the offeror apparatus comprises a FLUS source and the answerer apparatus comprises a FLUS sink.

50. The offeror apparatus of claim 41, wherein the first plurality of QoS parameters further include an uplink value indicating how to distribute the first desirable maximum end-to-end packet latency across an uplink communication link of the offeror apparatus.

51. The offeror apparatus of claim 50, wherein:
the offeror apparatus comprises a FLUS source and the answerer apparatus comprises a FLUS sink, or
the offeror apparatus comprises a FLUS sink and the answerer apparatus comprises a FLUS source.

52. The offeror apparatus of claim 41, wherein:
the offeror apparatus is the UE and the answerer apparatus is the non-UE network node, and
the communication device comprises at least one transceiver.

53. The offeror apparatus of claim 41, wherein:
the offeror apparatus is the non-UE network node and the answerer apparatus is the UE, and
the communication device comprises at least one network interface.

54. The offeror apparatus of claim 41, wherein the one or more processors are further configured to:
cause the communication device to send, to the answerer apparatus, an acceptance of the second plurality of QoS parameters for the multimedia session.

55. An answerer apparatus, comprising:
means for receiving, from an offeror apparatus, an offer including a first plurality of quality of service (QOS) parameters for a multimedia session to be established between the offeror apparatus and the answerer apparatus, the first plurality of QoS parameters including a first latency parameter indicating a first desirable maximum end-to-end packet latency for the multimedia session in milliseconds, the first plurality of QoS parameters received in a first session description protocol (SDP) message;
means for determining that the first desirable maximum end-to-end packet latency is higher than a second desirable maximum end-to-end packet latency for the multimedia session; and
means for sending, to the offeror apparatus, an answer including a second plurality of QoS parameters for the multimedia session, the second plurality of QoS parameters including a second latency parameter indicating the second desirable maximum end-to-end packet latency in milliseconds, the second plurality of QoS parameters sent in a second SDP message,
wherein (1) the offeror apparatus is a user equipment (UE) that originates the offer and the answerer apparatus is a non-UE network node that originates the answer, or (2) the offeror apparatus is the non-UE network node that originates the offer and the answerer apparatus is the UE that originates the answer, and
wherein the multimedia session comprises a FLUS session, a multimedia telephony service for internet protocol (IP) multimedia subsystem (IMS) (MTSI) session, an extended reality session, a telepresence session, or a split rendering session.

56. An offeror apparatus, comprising:
means for sending, to an answerer apparatus, an offer including a first plurality of quality of service (QOS) parameters for a multimedia session to be established between the offeror apparatus and the answerer apparatus, the first plurality of QoS parameters including a first latency parameter indicating a first desirable maximum end-to-end packet latency for the multimedia session in milliseconds, the first plurality of QoS parameters sent in a first session description protocol (SDP) message;
means for receiving, from the answerer apparatus, an answer including a second plurality of QoS parameters for the multimedia session, the second plurality of QoS parameters including a second latency parameter indicating a second desirable maximum end-to-end packet latency for the multimedia session in milliseconds, the second plurality of QoS parameters received in a second SDP message;
means for determining whether or not the offeror apparatus can establish the multimedia session with the answerer apparatus based on the multimedia session having the second plurality of QoS parameters; and
means for establishing the multimedia session with the answerer apparatus, the multimedia session having the second plurality of QoS parameters,
wherein (1) the offeror apparatus is a user equipment (UE) that originates the offer and the answerer apparatus is a non-UE network node that originates the answer, or (2) the offeror apparatus is the non-UE network node that originates the offer and the answerer apparatus is the UE that originates the answer, and
wherein the multimedia session comprises a FLUS session, a multimedia telephony service for internet protocol (IP) multimedia subsystem (IMS) (MTSI) session, an extended reality session, a telepresence session, or a split rendering session.

57. A non-transitory computer-readable medium storing computer-executable instructions that, when executed by an answerer, cause the answerer to:
receive, from an offeror, an offer including a first plurality of quality of service (QOS) parameters for a multimedia session to be established between the offeror and the answerer, the first plurality of QoS parameters including a first latency parameter indicating a first desirable maximum end-to-end packet latency for the multimedia session in milliseconds, the first plurality of QoS parameters received in a first session description protocol (SDP) message;

determine that the first desirable maximum end-to-end packet latency is higher than a second desirable maximum end-to-end packet latency for the multimedia session; and send, to the offeror, an answer including a second plurality of QoS parameters for the multimedia session, the second plurality of QoS parameters including a second latency parameter indicating the second desirable maximum end-to-end packet latency in milliseconds, the second plurality of QoS parameters sent in a second SDP message, wherein (1) the offeror is a user equipment (UE) that originates the offer and the answerer is a non-UE network node that originates the answer, or (2) the offeror is the non-UE network node that originates the offer and the answerer is the UE that originates the answer, and wherein the multimedia session comprises a FLUS session, a multimedia telephony service for internet protocol (IP) multimedia subsystem (IMS) (MTSI) session, an extended reality session, a telepresence session, or a split rendering session.

58. A non-transitory computer-readable medium storing computer-executable instructions that, when executed by an offeror, cause the offeror to:

send, to an answerer, an offer including a first plurality of quality of service (QOS) parameters for a multimedia session to be established between the offeror and the answerer, the first plurality of QoS parameters including a first latency parameter indicating a first desirable maximum end-to-end packet latency for the multimedia session in milliseconds, the first plurality of QoS parameters sent in a first session description protocol (SDP) message;

receive, from the answerer, an answer including a second plurality of QoS parameters for the multimedia session, the second plurality of QoS parameters including a second latency parameter indicating a second desirable maximum end-to-end packet latency for the multimedia session in milliseconds, the second plurality of QoS parameters received in a second SDP message;

determine whether or not the offeror can establish the multimedia session with the answerer based on the multimedia session having the second plurality of QoS parameters; and establish the multimedia session with the answerer, the multimedia session having the second plurality of QoS parameters, wherein (1) the offeror is a user equipment (UE) that originates the offer and the answerer is a non-UE network node that originates the answer, or (2) the offeror is the non-UE network node that originates the offer and the answerer is the UE that originates the answer, and wherein the multimedia session comprises a FLUS session, a multimedia telephony service for internet protocol (IP) multimedia subsystem (IMS) (MTSI) session, an extended reality session, a telepresence session, or a split rendering session.

* * * * *